(12) United States Patent
Isogai et al.

(10) Patent No.: US 9,229,105 B2
(45) Date of Patent: Jan. 5, 2016

(54) RELATIVE POSITION DETECTION DEVICE FOR VEHICLE

(71) Applicant: DENSO CORPORATION, Kariya, Aichi-pref. (JP)

(72) Inventors: Toshiki Isogai, Nagoya (JP); Mitsuyasu Matsuura, Chiryu (JP); Tatsuru Kuwabara, Takahama (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 14/072,909

(22) Filed: Nov. 6, 2013

(65) Prior Publication Data

US 2014/0136095 A1 May 15, 2014

(30) Foreign Application Priority Data

Nov. 9, 2012 (JP) ................................. 2012-247231

(51) Int. Cl.
*G01S 15/06* (2006.01)
*G01S 15/93* (2006.01)
*G01S 15/87* (2006.01)
*G05D 1/02* (2006.01)

(52) U.S. Cl.
CPC ............... *G01S 15/931* (2013.01); *G01S 15/87* (2013.01); *G05D 1/0287* (2013.01)

(58) Field of Classification Search
CPC ...... G01S 15/931; G01S 15/87; G05D 1/0287
USPC ............. 701/300; 342/70; 340/943, 901, 904; 367/909, 99, 98
See application file for complete search history.

(56) References Cited

U.S. PATENT DOCUMENTS

| | | | | |
|---|---|---|---|---|
| 4,026,654 A | * | 5/1977 | Beaurain | 356/5.07 |
| 4,240,152 A | * | 12/1980 | Duncan et al. | 367/108 |
| 4,910,512 A | * | 3/1990 | Riedel | 340/943 |
| 5,067,115 A | * | 11/1991 | Wada | 367/99 |
| 5,805,527 A | * | 9/1998 | Hoashi et al. | 367/99 |
| 2005/0093735 A1 | * | 5/2005 | Samukawa et al. | 342/70 |
| 2008/0215241 A1 | * | 9/2008 | Hanagasaki | 701/300 |
| 2009/0135069 A1 | * | 5/2009 | Tsai et al. | 343/700 MS |

FOREIGN PATENT DOCUMENTS

JP  H 02-76009  3/1990
JP  2006-330980  12/2008

* cited by examiner

*Primary Examiner* — Marthe Marc-Coleman
(74) *Attorney, Agent, or Firm* — Harness, Dickey & Pierce, P.L.C.

(57) ABSTRACT

A relative position detection device is used for a traveling system that allows a first and second vehicles to travel such that the first vehicle precedes and the second vehicle follows the first vehicle. The detecting device includes a sensor pair of a first and second sensors and an arithmetic unit. The first and second sensors are located at the same height on the right and left end portions of the front surface of the second vehicle. The first and second sensors emits transmission waves from their located positions in their front directions and receives their reflected waves. The arithmetic unit detects a direction of deviation between the first and second vehicles in the right and left direction on the basis of a difference between a first intensity of the reflected wave received by the first sensor and a second intensity of the reflected waves received by the second sensor.

20 Claims, 12 Drawing Sheets

LEFT ULTRASOUND SENSOR

RIGHT ULTRASOUND SENSOR

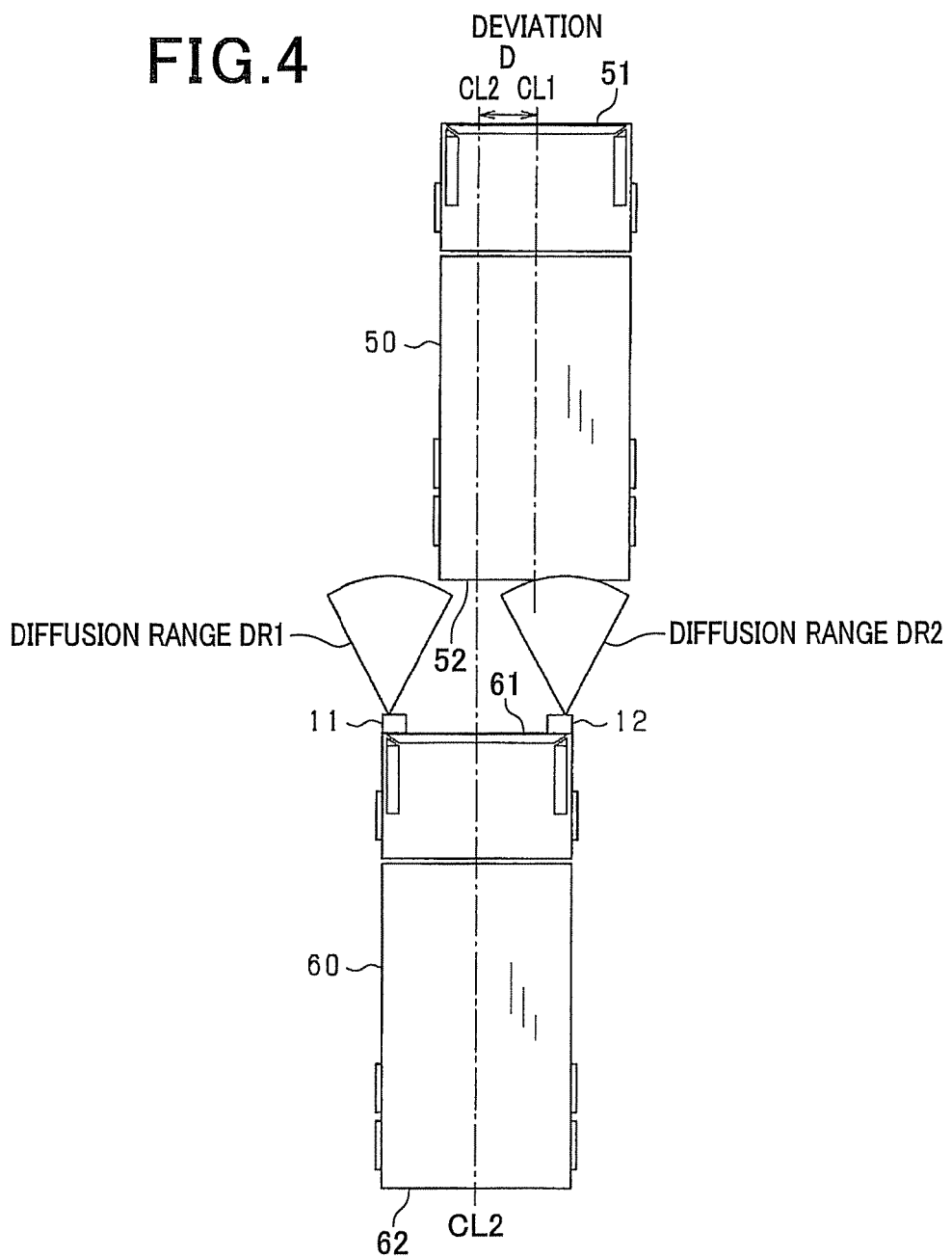
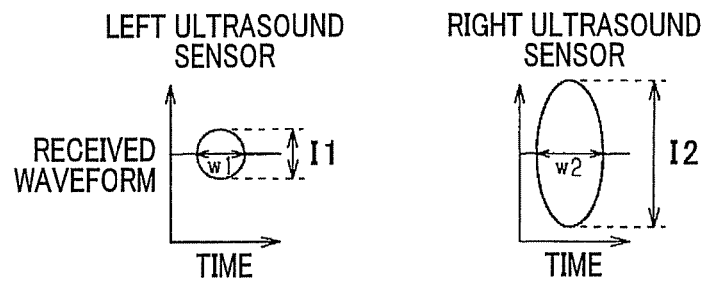

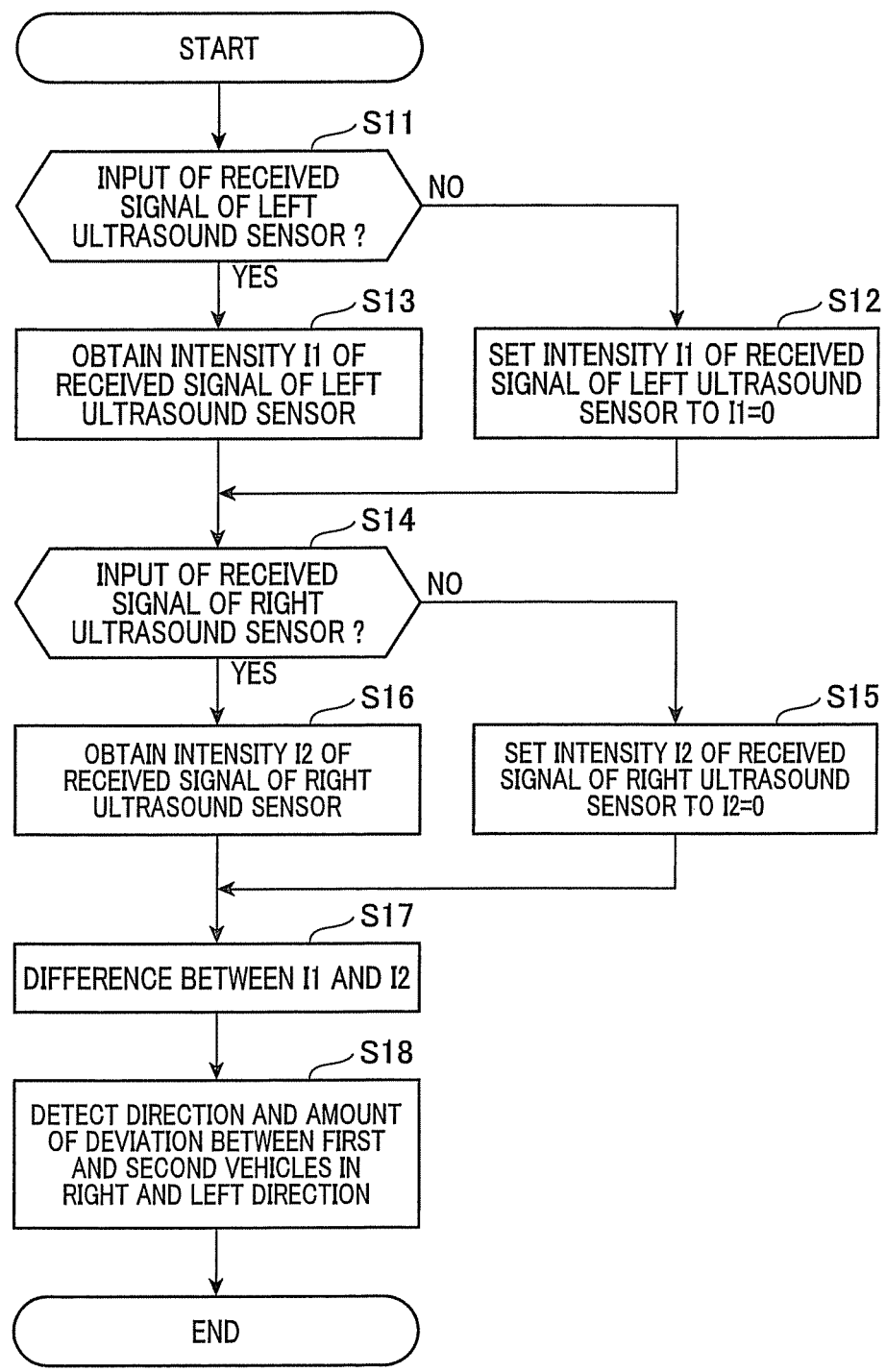

RELATIVE POSITION DETECTION DEVICE FOR VEHICLE

CROSS-REFERENCE TO RELATED APPLICATION

This application is based on and claims the benefit of priority from earlier Japanese Patent Application No. 2012-247231 filed Nov. 9, 2012 the description of which is incorporated herein by reference.

BACKGROUND

1. Technical Field

The present invention relates to a relative position detection device for a vehicle, and in particular to a relative position detection device that is applicable to a travelling system that allows a following vehicle to follow a preceding vehicle, which detects a relative position of the preceding vehicle and the following vehicle in the right and left direction.

2. Related Art

In related art, an unmanned vehicle travelling system is known that includes first and second unmanned vehicles and allows the first and second unmanned vehicles to travel such that the first unmanned vehicle precedes and the second unmanned vehicle follows the first unmanned vehicle.

In this regard, JP-A-H02-076009 discloses an unmanned vehicle travelling system including the first and second unmanned vehicles. In the travelling system, the second unmanned vehicle is provided with a plurality of reflective photoelectric switches on the front surface thereof, and the first unmanned vehicle is provided with a reflecting plate on the rear surface thereof. The photoelectric switches are separated from one another in the right and left direction by a predetermined distance. The reflecting plate is located on the same height as the photoelectric switches.

The photoelectric switches on the second unmanned vehicle emit light toward the first photoelectric switches. Then, only the photoelectric switches that receive the light reflected by the reflecting plate are turned on. Thus, an amount of positional deviation in the right and left direction of the second unmanned vehicle with respect to the first unmanned vehicle can be determined by detecting which photoelectric switches have been turned on.

In a travelling system that allows logistic vehicles or the like to travel in a platoon of vehicles, a distance between a preceding vehicle and a following vehicle increases compared to the travelling system disclosed in JP-A-H02-076009. The long distance between the vehicles makes it difficult to detect an amount of positional deviation in the right and left direction of the following vehicle with respect to the preceding vehicle by using light having a large attenuation factor with respect to a transmission distance, as described in JP-A-H02-076009. Additionally, on daytime public roads, there is a large amount of ambient light (white noise). The also makes it difficult to detect the amount of positional deviation in the right and left direction of the following vehicle with respect to the preceding vehicle by using light.

Further, in the case where ultrasound waves or electromagnetic waves are transmitted from a plurality of sensors separated from one another in the right and left direction by a predetermined distance as disclosed in JP-A-H02-076009, the long distance between two vehicles widens the range in which the ultrasound waves or electromagnetic waves are received. This allows the reflected waves to be received by sensors other than sensors opposed to the reflection plate, thereby reducing detection accuracy of the amount of positional deviation in the right and left direction. From this, a technique disclosed in JP-A-H02-076009 is applied to use narrow-directivity ultrasound waves or electromagnetic waves, but then cannot be used for wide-directivity ultrasound or electromagnetic waves.

SUMMARY

The present disclosure provides a relative position detection device for a vehicle, which is able to detect an amount of positional deviation in the right and left direction of a following vehicle with respect to a preceding vehicle, even when wide-directivity sound waves or electromagnetic waves are used.

According to a first aspect of the present disclosure, there is provided a relative position detection device that is applied to a traveling system that allows first and second vehicles to travel in such a manner that the first vehicle precedes and the second vehicle follows the first vehicle. The detecting device includes: a sensor pair of first and second sensors that are located at the same height on a right and left end portion of at least one of a rear surface of the first vehicle and a front surface of the second vehicle, the first and second sensors emitting transmission waves from their located positions in their front directions and receiving their reflected waves; and an arithmetic unit that detects a direction of deviation between the first and second vehicles in a right and left direction on the basis of a difference between a first intensity of the reflected waves received by the first sensor and a second intensity of the reflected waves received by the second sensor.

According to the first aspect, the sensor pair of the first and second sensors are located at the same height on the right and left end portions of at least one of a rear surface of the first vehicle and a front surface of the second vehicle, and the transmission waves are emitted from their located positions in their front directions by the first and second sensors.

Since the first and second sensors are located on the right and left end portions of the vehicle, even when the transmission waves from the first and second sensors are diffused, their diffusion ranges can be prevented from overlapping with each other. The transmission waves emitted from the first and second sensors are reflected at the first or second vehicle facing the first and second sensors, and then their reflected waves are received by the first and second sensors.

When the first and second vehicles are not deviated from each other in the right and left direction, the intensities of reflected waves received by the left and right ultrasound sensors become equal to each other. However, when the first and second vehicles are deviated from each other in the right and left direction, a difference between the intensities of reflected waves received by the left and right ultrasound sensors occurs depending on the direction of deviation.

This makes it possible to detect the direction of deviation in the right and left direction, based on the difference between the intensities of reflected waves received by the left and right ultrasound sensors. Thus, even when wide-directivity sound waves or electromagnetic waves are used, a relative position between the following vehicle and the preceding vehicle in the right and left direction can be detected.

According to a second aspect of the present disclosure, there is provided a relative position detection device that is applied to a traveling system that allows first and second vehicles to travel in such a manner that the first vehicle precedes and the second vehicle follows the first vehicle. The detecting device includes: a sensor pair of first and second sensors that are located at the same height on a right and left end portions of at least one of a rear surface of the first vehicle and a front surface of the second vehicle, the first and second sensors emitting transmission waves formed of pulsed waves from their located positions in their front directions and receiving their reflected waves; and an arithmetic unit that detects a direction of deviation between the first and second vehicles in a right and left direction on the basis of a difference between a first pulse length of the reflected waves received by the first sensor and a second pulse length of the reflected waves received by the second sensor.

According to the second aspect, in the same manner as the first aspect, the transmission waves of pulsed waves emitted from the first and second sensors are reflected at the first or second vehicle facing the first and second sensors, and then their reflected waves are received by the first and second sensors. When the first and second vehicles are deviated from each other in the right and left direction, a difference between pulse lengths of reflected waves received by the left and right ultrasound sensors occurs depending on the direction of deviation.

This makes it possible to detect the direction of deviation in the right and left direction, based on the difference between the pulse lengths of reflected waves received by the left and right ultrasound sensors. Thus, even when wide-directivity sound waves or electromagnetic waves are used, a relative position between the following vehicle and the preceding vehicle in the right and left direction can be detected.

According to a third aspect of the present disclosure, there is provided a relative position detection device that is applied to a traveling system that allows first and second vehicles to travel in such a manner that the first vehicle precedes and the second vehicle follows the first vehicle. The detecting device includes: a center sensor that is located at a center portion of at least one of a rear surface of the first vehicle and a front surface of the second vehicle, the center sensor emitting first transmission waves from its located position in a front direction and receiving its reflected waves; a sensor pair of first and second sensors that are located at the same height on right and left positions, symmetrical with respect to a center line of a vehicle body, of at least the other of the rear surface of the first vehicle and the front surface of the second vehicle, the first and second sensors receiving the first transmission waves; and an arithmetic unit that detects a direction of deviation between the first and second vehicles in a right and left direction on the basis of a difference between a first time from when the first transmission waves are emitted from the center sensor until when the first transmission waves are received by the first sensor and a second time from when the first transmission waves are emitted from the center sensor until when the first transmission waves are received by the second sensor.

According to the third aspect, the center sensor is located at the center portion of at least one of the rear surface of the first vehicle and the front surface of the second vehicle. The first transmission waves are emitted by the center sensor from its located position in its front direction. Then, the first transmitted waves from the center sensor are received by the first and second sensors provided on right and left positions, symmetrical with respect to a center line of a vehicle body, of at least the other of the rear surface of the first vehicle and the front surface of the second vehicle.

When the first and second vehicles are not deviated from each other in the right and left direction, a distance from the center ultrasound sensor to the first ultrasound sensor is equal to a distance from the center ultrasound sensor to the second ultrasound sensor. However, when the first and second vehicles are deviated from each other in the right and left direction, a distance from the center ultrasound sensor to the first ultrasound sensor is different from a distance from the center ultrasound sensor to the second ultrasound sensor.

This results in a difference between times until when the first ultrasound waves from the center ultrasound sensor are received by the first and second ultrasound sensors, depending the direction of deviation between the first and second vehicles. Thus, the direction of deviation between the first and second vehicles in the right and left direction can be detected based on the difference between times until when the first ultrasound waves from the center ultrasound sensor are received by the first and second ultrasound sensors.

Therefore, even when wide-directivity sound waves or electromagnetic waves are used, the relative position between the following vehicle and the preceding vehicle in the right and left direction can be detected.

In addition, since the first and second ultrasound sensors receive the first ultrasound waves emitted from the center sensor as not reflected waves but direct waves, reception intensity of the first ultrasound waves is larger than the case where the reflected waves are received. This makes it possible to further increase a distance at which the device is capable of detecting a relative position between the first and second vehicles.

According to a fourth aspect of the present disclosure, there is provided a relative position detection device that is applied to a traveling system that allows first and second vehicles to travel in such a manner that the first vehicle precedes and the second vehicle follows the first vehicle. The detecting device includes: a center sensor that is located at a center portion of a front surface of the second vehicle, the center sensor emitting first transmission waves and receiving its reflected waves; a sensor pair of first and second sensors that are located at the same height at a right and left positions, symmetrical with respect to a center line of a vehicle body, of a rear surface of the first vehicle, the first and second sensors receiving the first transmission waves and emitting second transmission waves, which are discriminable from each other, from their located positions in their front directions subsequently or after a predetermined period of time has elapsed after the first transmission waves are received; and an arithmetic unit that detects a direction of deviation between the first and second vehicles in a right and left direction on the basis of a difference between a first time from when the first transmission wave is emitted from the center sensor until when the second transmission waves emitted from the first sensor are received by the center sensor and a second time from when the first transmission waves are emitted from the center sensor until when the second transmission waves emitted from the second sensor are received by the center sensor.

According to the fourth aspect, the center sensor is located at the center portion of the front surface of the second vehicle. The first transmission waves are emitted by the center sensor from its located position in its front direction. Then, the first transmission waves from the center sensor is received by the first and second sensors provided on the right and left positions, symmetrical with respect to a center line of a vehicle body, of the rear surface of the first vehicle. Subsequently or after a predetermined period of time has elapsed after the first transmission waves are received, the second transmission waves, which are discriminable from each other, are emitted by the first and second sensors from their located positions in their front directions. The second transmission waves emitted from first and second sensors are received by the center sensor.

When the first and second vehicles are not deviated from each other in the right and left direction, a distance from the center ultrasound sensor to the first ultrasound sensor is equal to a distance from the center ultrasound sensor to the second ultrasound sensor. However, when the first and second vehicles are deviated from each other in the right and left direction, a distance from the center ultrasound sensor to the first ultrasound sensor is different from a distance from the center ultrasound sensor to the second ultrasound sensor.

This results in a difference between times until when the second ultrasound waves emitted from the first and second ultrasound sensors are received by the center ultrasound sensor, depending the direction of deviation between the first and second vehicles. Thus, the direction of deviation between the first and second vehicles in the right and left direction can be detected based on the difference between times until when the second ultrasound waves emitted from the first and second ultrasound sensors are received by the center ultrasound sensor.

Therefore, even when wide-directivity sound waves or electromagnetic waves are used, the relative position between the following vehicle and the preceding vehicle in the right and left direction can be detected.

In addition, the center ultrasound sensor receives the second ultrasound waves emitted from the first and second sensors as not reflected waves but direct waves. This makes it possible to further increase a distance at which the device is capable of detecting a relative position between the first and second vehicles.

BRIEF DESCRIPTION OF DRAWINGS

In the accompanying drawings:

FIG. 4 is a plan view of a preceding truck and a following truck that are deviated from each other in the right and left direction according to the first embodiment;

FIGS. 5A and 5B are graphs showing an intensity of reflected waves received by each of sensors forming a pair of ultrasound sensors in FIG. 4;

FIG. 6 is a flowchart showing a procedure for detecting a relative position of vehicles according to the first embodiment;

DESCRIPTION OF EMBODIMENTS

Hereinafter, embodiments of a relative position detection device for a vehicle will be described with reference to the drawings. This detection device is applied to a travelling system that allows a preceding first truck (first vehicle) and a second truck (second vehicle) to follow the first truck. In the following embodiments, parts of the detection device according to one embodiment identical or equivalent to that of the remaining ones are denoted by the same reference signs, and descriptions of the parts of one embodiment are incorporated in those of the remaining ones.

(First Embodiment)

Figure 1:
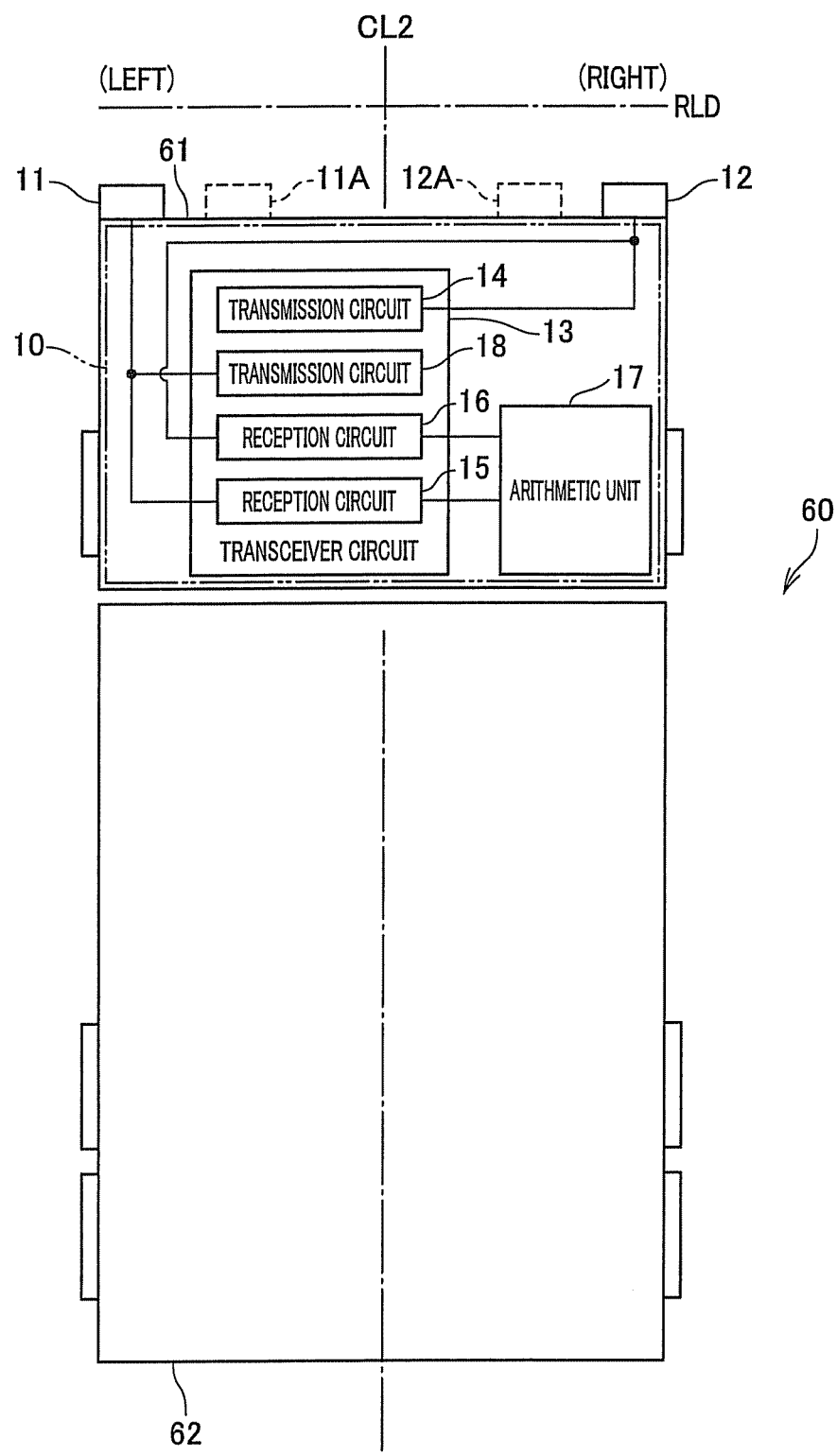
FIG. 1 is a block diagram of a relative position detection device for a vehicle according to a first embodiment and a plan view of the vehicle.

With reference to FIG. 1, a configuration of a relative position detection device for a vehicle according to a first embodiment is described. This relative position detection device of the first embodiment is mounted in a truck 60 (corresponding to a second vehicle) following a truck 50 (corresponding to a first vehicle shown in FIGS. 2 and 4 as described later) and includes a device body 10 and a first and second ultrasound sensors 11 and 12 forming a sensor pair. The device body 10 is provided with a transceiver circuit 13 and an arithmetic unit (calculation unit) 17. The truck 50 may act as the second vehicle with respect to another preceding vehicle. In this case, the relative position detection device may be also mounted in the truck 50.

The first and second ultrasound sensors 11 and 12 are located at the same height on the left and right end portions (corresponding to the right and left positions symmetrical with respect to the center line CL2 of the vehicle body) on the front surface 61 of the truck 60. Hereafter, the first ultrasound sensor 11 on the left end portion is referred to as "left ultrasound sensor", and the second ultrasound sensor 12 on the right end portion is referred to as "right ultrasound sensor". Logistic vehicles such as trucks or the like are generally provided with ultrasound sensors which are located in the right and left end portions on the front and rear surfaces of the vehicle in order to detect obstacles around the vehicle when parked. Such ultrasound sensors that are generally provided may be used as the left and right ultrasound sensors 11 and 12.

The left and right ultrasound sensors 11 and 12 emit ultrasound pulsed waves (transmission waves) in their front directions from sensor-located positions at which they are located, and receive their reflected waves (return of the ultrasound waves or echoes). Since the left and right ultrasound sensors 11 and 12 are placed at the left and right end portions, respectively, on the front surface 61 of the truck 60, even when the ultrasound waves from left and right ultrasound sensors 11 and 12 are diffused, overlap between their diffusion ranges is reduced. The left and right ultrasound sensors 11 and 12 are adjusted such that ultrasound waves (corresponding to transmission waves) emitted therefrom have the same directivity characteristics when the trucks 50 and 60 are not deviated from each other in the right and left direction RLD.

The transceiver circuit 13 includes transmission circuits 14 and 18 and reception circuits 15 and 16. The transmission circuits 18 and 14 are electrically connected to the left and right ultrasound sensors 11 and 12, respectively, and apply electric signals to the left and right ultrasound sensors 11 and 12 such that ultrasound pulsed waves are emitted from the left and right ultrasound sensors 11 and 12. The reception circuits 15 and 16 are electrically connected to the left and right ultrasound sensors 11 and 12, respectively, and output voltages corresponding to intensities of reflected waves across output resistors connected to output terminals such that reflected waves received by the left and right ultrasound sensors 11 and 12 are detected as electrical signals.

The arithmetic unit 17 is electrically connected to the reception circuits 15, 16. Based on the detected received signals, i.e., intensities of reflected waves, the arithmetic unit 17 detects a relative position between the trucks 50 and 60 in the right and left direction (lateral direction) RLD. For example, the arithmetic unit 17 is configured as a known microcomputer including a central processing unit (CPU), a read-only memory (ROM), a random access memory (RAM), and the like. The CPU performs a process to detect a relative position between the trucks 50 and 60 in the right and left direction RLD described hereafter, using programs stored in the ROM, programs loaded into the RAM, and the like.

Next, with reference to FIGS. 2 to 6, a technique for detecting a relative position between the trucks 50 and 60 in the right and left direction RLD is described in detail.

Figure 2:
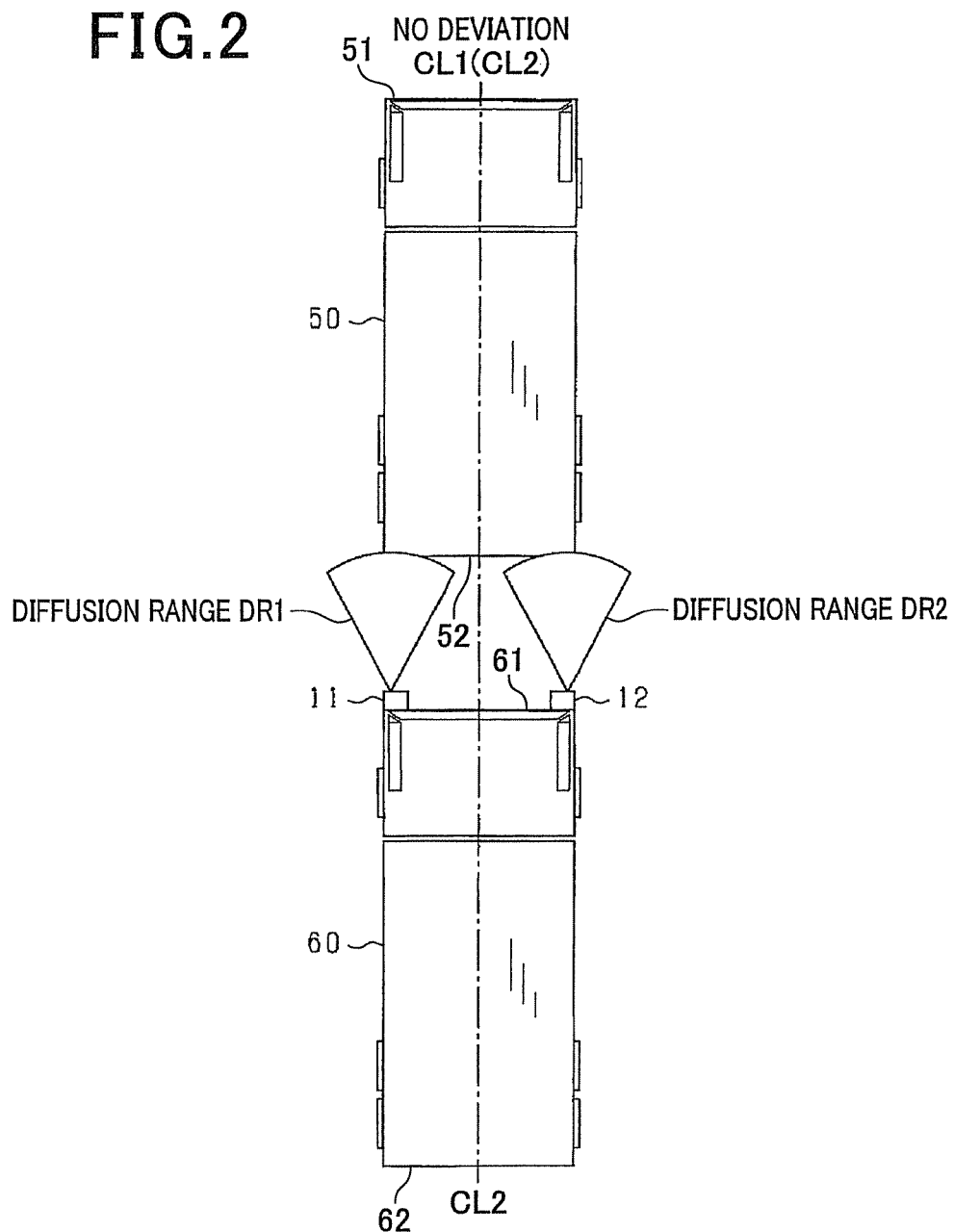
FIG. 2 is a plan view of a preceding truck and a following truck that are not deviated from each other in the right and left direction according to the first embodiment.
Figure 3A:
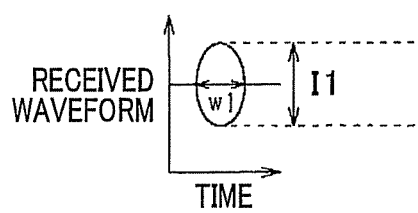
FIGS. 3A and 3B are graphs showing an intensity of reflected waves received by each of sensors forming a pair of ultrasound sensors in FIG. 2.
Figure 3B:
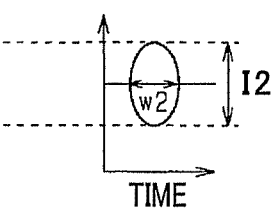

FIG. 2 shows a relative position between the trucks 50 and 60 in the right and left direction RLD when the trucks 50 and 60 are not deviated from each other in the right and left direction RLD (the center line CL1 of the vehicle body of the truck 50 coincides with the center line CL2 of the vehicle body of the truck 60). FIGS. 3A and 3B show envelopes of reflected waves received by the left and right ultrasound sensors 11 and 12 in the case of FIG. 2. As shown in FIG. 2, the left and right ultrasound sensors 11 and 12 emit ultrasound waves such that a half of diffusion ranges DR1 and DR2 in the horizontal direction of ultrasound waves covers the rear surface 52 of the truck 50.

As shown in FIGS. 3A and 3B, the reflected waves received by the left and right ultrasound sensors 11 and 12 have the same waveform, because the left and right ultrasound sensors 11 and 12 are adjusted such that ultrasound waves emitted therefrom have the same directivity characteristics when the trucks 50 and 60 are not deviated from each other in the right and left direction RLD. Here, as for reflected waves received by the left ultrasound sensor 11, the maximum value of intensity (amplitude) is denoted by I1, and a pulse length is denoted by W1. As for reflected waves received by the right ultrasound sensor 12, the maximum value of intensity (amplitude) is denoted by I2, and a pulse length is denoted by W2. Then, I1=I2 and W1=W2 when the trucks 50 and 60 are not deviated from each other.

FIG. 4 shows a relative position between the trucks 50 and 60 in the right and left direction RID when the truck 60 provided with the left and right ultrasound sensors 11 and 12 is deviated in the left direction with respect to the truck 50 facing the left and right ultrasound sensors 11 and 12 (the center line CL1 of the vehicle body of the truck 50 does not coincide with the center line CL2 of the vehicle body of the truck 60). FIGS. 5A and 5B show envelopes of reflected waves received by the left and right ultrasound sensors 11 and 12 in the case of FIG. 4.

As shown in FIGS. 5A and 5B, the reflected waves received by the left and right ultrasound sensors 11 and 12 have the different waveform. This results in a difference in the maximum value of intensity and a pulse length of the received reflected waves. Compared to the case where the trucks 50 and 60 are not deviated from each other in the right and left direction RLD as shown in FIGS. 3A and 3B, the intensity I1 and the pulse length W1 of the reflected waves received by the left ultrasound sensor 11 are smaller as shown in FIG. 5A, and the intensity I2 and the pulse length W2 of the reflected waves received by the right ultrasound sensor 12 are larger as shown in FIG. 5B.

In the case where the truck 60 is deviated in the left direction with respect to the truck 50, ultrasound waves emitted from the right ultrasound sensor 12 have a range that is wider than a half of the diffusion range DR2 in the horizontal direction of the ultrasound waves and covers the rear surface 52 of the truck 50. Furthermore, ultrasound waves emitted from the left ultrasound sensor 11 have a range that is narrower than a half of the diffusion range DR1 in the horizontal direction of the ultrasound waves and covers the rear surface 52 of the truck 50.

Therefore, in the case where the truck 60 is deviated in the left direction with respect to the truck 50, compared to the case where the trucks 50 and 60 are not deviated from each other in the right and left direction RLD, the intensity I1 and the pulse length W1 of the reflected waves received by the left ultrasound sensor 11 become smaller, and the intensity I2 and the pulse length W2 of the reflected waves received by the right ultrasound sensor 12 become larger.

In other words, when the truck 60 is deviated in the left direction with respect to the truck 50 (with reference to the front direction of the left and right ultrasound sensors 11 and 12), the intensity I1 of reflected waves received by the left ultrasound sensor 11 becomes smaller than the intensity I2 of reflected waves received by the right ultrasound sensor 12. When the truck 60 is deviated in the right direction with respect to the truck 50, the intensity I2 of reflected waves received by the right ultrasound sensor 12 becomes smaller than the intensity I1 of reflected waves received by the left ultrasound sensor 11.

In this manner, the arithmetic unit 17 detects a relative position between the trucks 50 and 60 in the right and left direction RLD, based on a difference between the intensities I1 and I2 of reflected waves received by the left and right ultrasound sensors 11 and 12.

There is a correlation between (i) a difference between intensities I1 and I2 of reflected waves received by the left and right ultrasound sensors 11 and 12 and (ii) an amount D of deviation in the right and left direction RLD between the trucks 50 and 60 (corresponding to a distance between the center lines CL1 and CL2 as shown in FIG. 4). Due to this, the arithmetic unit 17 also detects the amount D of deviation in the right and left direction RLD between the trucks 50, 60, based on the difference between intensities of reflected waves received by the left and right ultrasound sensors 11 and 12.

Next, a process to detect a relative position between vehicles performed by the arithmetic unit 17 is described with reference to FIG. 6.

First, the arithmetic unit 17 determines whether or not the received signal of reflected waves received by the left ultrasound sensor 11 has been inputted at step S11. When the received signal has not been inputted (NO at step S11), the arithmetic unit 17 sets the intensity I1 of the received signal of the left ultrasound sensor 11 to zero (I1=0) at step S12. On the other hand, when the received signal has been inputted (YES at step S11), the arithmetic unit 17 obtains the intensity I1 of the received signal of the left ultrasound sensor 11 at step S13.

Subsequently, the arithmetic unit 17 determines whether or not the received signal of reflected waves received by the right ultrasound sensor 12 has been inputted at step S14. When the received signal has not been inputted (NO at step S14), the arithmetic unit 17 sets the intensity I2 of the received signal of the right ultrasound sensor 12 to zero (I2=0) at step S15. On the other hand; when the received signal has been inputted (YES at step S14), the arithmetic unit 17 obtains the intensity I2 of the received signal of the right ultrasound sensor 12 at step S16.

Subsequently, the arithmetic unit 17 calculates the difference between the intensity I1 of the received signal of the left ultrasound sensor 11 and the intensity I2 of the received signal of the right ultrasound sensor 12 at step S17, and then detects a direction and amount of deviation between the trucks 50 and 60 in the right and left direction RLD at step S18.

Specifically, as the direction of deviation of the truck 60 provided with the left and right ultrasound sensors 11 and 12 with reference to the front direction of the left and right ultrasound sensors 11 and 12, the arithmetic unit 17 detects the sensor-located side at which the left or right ultrasound sensor 11 or 12 receiving reflected waves with smaller of intensities of reflected waves received by the left and right ultrasound sensors 11 and 12 is located. For example, when the intensity I1 of reflected waves received by the left ultrasound sensor 11 is smaller than the intensity I2 of reflected waves received by the right ultrasound sensor 12, the arithmetic unit 17 detects that the truck 60 is deviated in the left direction with respect to the truck 50.

Furthermore, a correlation (for example, correlation map or relational expression) between (i) a difference $\Delta I = |I1-I2|$ between intensities I1 and I2 of reflected waves received by the left and right ultrasound sensors 11 and 12 and (ii) an amount D of deviation in the right and left direction RLD between the trucks 50 and 60 is prepared in advance and held in the arithmetic unit 17 (for example, the ROM). Then, the arithmetic unit 17 applies the difference $\Delta I$ between intensities I1 and I2 of reflected waves to the prepared correlation, and then detects the amount D of deviation in the right and left direction RLD between the trucks 50 and 60.

The direction and amount D of deviation of the truck 60 with respect to the truck 50 detected by the arithmetic unit 17 is used to automatically control a vehicle speed, an amount of steering operation, or the like of the truck 60. This makes it possible to allow the truck 60 to automatically follow the truck 50.

According to the first embodiment as described above, the following effects are obtained.

When the trucks 50 and 60 are not deviated from each other in the right and left direction RLD, the intensities I1 and I2 of reflected waves received by the left and right ultrasound sensors 11 and 12 become equal to each other. However, when the trucks 50 and 60 are deviated from each other in the right and left direction RLD, a difference between the intensities I1 and I2 of reflected waves received by the left and right ultrasound sensors 11 and 12 occurs depending on the direction of deviation. This makes it possible to detect the direction of deviation in the right and left direction RLD, based on the difference between the intensities I1 and I2 of reflected waves received by the left and right ultrasound sensors 11 and 12. Thus, even when wide-directivity ultrasound waves are used, an amount of positional deviation in the right and left direction RLD between the following vehicle and the preceding vehicle can be detected.

Further, in the first embodiment, as the direction of deviation of the truck 60 provided with the left and right ultrasound sensors 11 and 12 (with reference to the front direction of the left and right ultrasound sensors 11 and 12), the arithmetic unit 17 can detect the sensor-located side at which the left or right ultrasound sensor 11 or 12 receiving reflected waves with smaller of intensities of reflected waves received by the left and right ultrasound sensors 11 and 12 is located.

When the trucks 50 and 60 are deviated from each other in the right and left direction RLD, a difference $\Delta I$ between intensities I1 and I2 of reflected waves received by the left and right ultrasound sensors 11 and 12 occurs depending on an amount D of deviation. In the first embodiment, a correlation between (i) a difference $\Delta I$ between intensities I1 and I2 of reflected waves and (ii) an amount D of deviation is prepared in advance, and a difference $\Delta I$ between intensities I1 and I2 of reflected waves is applied to the prepared correlation. Thus, the amount D of deviation in the right and left direction RLD between the trucks 50 and 60 can be detected.

Many logistic vehicles such as the trucks 50 and 60 have been already provided with ultrasound sensors which are located in the right and left end portions on the front and rear surfaces of the vehicle in order to detect obstacle around the vehicle when parked. If such ultrasound sensors that have been already provided are used as the left and right ultrasound sensors 11 and 12, a relative position between a preceding vehicle and a following vehicle in the right and left direction RLD can be detected at low cost.

When the trucks 50 and 60 are deviated from each other in the right and left direction RLD, an intensity (I1 or I2) of reflected waves received by one of the left and right ultrasound sensors 11 and 12 becomes smaller and an intensity (I2 or I1) of reflected waves received by the other of the left and right ultrasound sensors 11 and 12 becomes larger. As a result, even when an amount D of deviation between the trucks 50 and 60 is small, a difference between the intensities I1 and I2 of received reflected waves is emphasized. Thus, a small deviation between the trucks 50 and 60 in the right and left direction RLD can be also detected.

(Modifications of First Embodiment)

The first embodiment may be modified to be worked as follows. The following modifications each may be combined as needed.

The larger the maximum intensity of reflected waves received by the left and right ultrasound sensors 11 and 12, the longer the pulse lengths W1 and W2 of the reflected waves. Thus, the direction of deviation in the right and left direction RLD between the trucks 50 and 60 may be detected based on a difference between pulse lengths W1 and W2 of the reflected waves received by the left and right ultrasound sensors 11 and 12.

In this case, as the direction of deviation of the truck 60 provided with the left and right ultrasound sensors 11 and 12 (with reference to the front direction of the left and right ultrasound sensors 11 and 12), the arithmetic unit 17 can detect the sensor-located side at which the left or right ultrasound sensor 11 or 12 receiving reflected waves with shorter pulse length of pulse lengths of reflected waves received by the left and right ultrasound sensors 11 and 12 is located.

A combination of the difference between the pulse lengths W1 and W2 of reflected waves as described in this modification and the difference between the intensities I1 and I2 of reflected waves as described in the first embodiment may be used. In the same way as the first embodiment and this modification, the arithmetic unit 17 can also detect the direction of deviation in the right and left direction RLD between the trucks 50 and 60, based on both the difference between the intensities I1 and I2 and the difference between the pulse length W1 and W2.

There is a correlation between (i) a difference between pulse lengths W1 and W2 of reflected waves received by the left and right ultrasound sensors 11 and 12 and (ii) an amount D of deviation in the right and left direction between the trucks 50 and 60 (corresponding to a distance between the center lines CL1 and CL2 as shown in FIG. 4).

Therefore, a correlation between (i) a difference $\Delta W=|W1-W2|$ between pulse lengths W1 and W2 of reflected waves received by the left and right ultrasound sensors 11 and 12 and (ii) an amount D of deviation in the right and left direction RLD between the trucks 50 and 60 may be prepared in advance and held in the arithmetic unit 17 (for example, the ROM). Then, the arithmetic unit 17 applies the difference $\Delta W$ between pulse length W1 and W2 of reflected waves to the prepared correlation, and then detects the amount D of deviation in the right and left direction RLD between the trucks 50 and 60.

A combination of the difference $\Delta W$ between the pulse lengths W1 and W2 of reflected waves described in this modification and the difference $\Delta I$ between the intensities I1 and I2 of reflected waves as described in the first embodiment may be used. In the same way as the first embodiment and this modification, the arithmetic unit 17 can also detect the amount D of deviation in the right and left direction RLD between the trucks 50 and 60, based on both of the difference $\Delta I$ and the difference $\Delta W$.

As shown by dashed lines of FIG. 1, third and fourth ultrasound sensors 11A and 12A forming a second sensor pair may be further provided on the front surface 61 of the truck 60. In FIG. 1, the second sensor pair of the third and fourth ultrasound sensors 11A and 12A is located inside in the horizontal direction by a predetermined distance from the left and right ultrasound sensors 11 and 12 forming a first sensor pair. Based on a width of the truck 50 facing the first and second sensor pairs, either of the first and second sensor pairs emits transmission waves and receives their reflected waves. The second sensor pair may be a sensor pair that emits ultrasound waves from their located positions in their front directions and receives their reflected waves. The second sensor pair may be configured such that an overlap between diffusion ranges DR1 and DR2 of ultrasound waves emitted from the third and fourth ultrasound sensors 11A and 12A is narrower than a predetermined range.

In this configuration, if a width of the truck 60 provided with the first and second sensor pairs is smaller than a width of the truck 50 facing the first and second sensor pairs, a relative position between the trucks 50 and 60 in the right and left direction RLD can be detected by means of the second sensor pair. Thus, the detection device is applicable to a traveling system that allows a following vehicle to follow a preceding vehicle different in width from the following vehicle.

The transceiver circuit 13 may be provided with a switch that switches connection to the transceiver circuit 13 between the first and second sensor pairs. In this case, when the first sensor pair emits ultrasound waves and cannot receive their reflected waves, the switch switches connection to the transceiver circuit 13 from the first sensor pair to the second sensor pair, and then the second sensor pair emits ultrasound waves. When the first sensor pair emits ultrasound waves and can receive their reflected waves, the first sensor pair continues emitting ultrasound waves.

Figure 7:
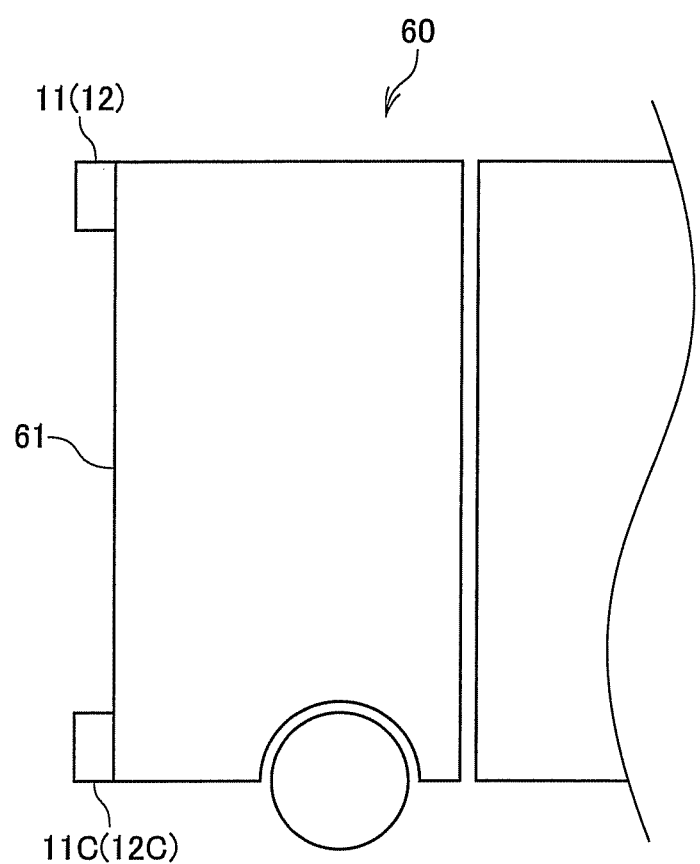
FIG. 7 is a side view of a vehicle provided with a relative position detection according to a modification of the first embodiment.

As shown in FIG. 7, the left and right ultrasound sensors 11 and 12 may be located at the upper end portion on the front surface 61 of the truck 60. By placing the left and right ultrasound sensors 11 and 12 at high positions, the effect of reflected waves from the ground surface can be eliminated.

Logistic vehicles such as trucks are higher in vehicle height than such as ordinary (general) vehicles such as passenger cars. In the case where the left and right ultrasound sensors 11 and 12 are provided at the upper end portion on the front surface 61 of the truck 60, even when the ordinary vehicle is present ahead of the truck 60, reflected waves from the ordinary vehicle are not returned to the truck 60. This can prevent the truck 60 from following an improper vehicle.

As shown in FIG. 7, a fifth and sixth ultrasound sensors 11C and 12C forming a third sensor pair may be further provided on the front surface 61 of the truck 60. In FIG. 7, the third sensor pair of the fifth and sixth ultrasound sensors 11C and 12C is located at a vertically lower side by a predetermined distance from the left and right ultrasound sensors 11 and 12 forming a first sensor pair.

The fifth and sixth ultrasound sensors 11C and 12C emit ultrasound waves from their located positions in their front directions and receives reflected waves. If reflected waves of ultrasound waves from the left and right ultrasound sensors 11 and 12 are not received by the left and right ultrasound sensors 11 and 12 and reflected waves of ultrasound waves from the fifth and sixth ultrasound sensors 11C and 12C are received by the fifth and sixth ultrasound sensors 11C and 12C, the arithmetic unit 17 judges that an ordinary vehicle is present at a position facing the truck 60 provided with the third sensor pair. The transceiver circuit 13 may be provided with a switch that switches connection to the transceiver circuit 13 between the first and third sensor pairs.

The left and right ultrasound sensors 11 and 12 may emit ultrasound waves such that a part (not a half) or all of the diffusion range DR1 and DR2 in the horizontal direction of ultrasound waves covers the rear surface 52 of the truck 50. Even though a difference between intensities of reflected waves in this modification is not emphasized as much as the difference between intensities of reflected waves in the first embodiment is emphasized, a difference between intensities I1 and I2 of reflected waves received by the left and right ultrasound sensors 11 and 12 occurs depending on the direction and amount D of deviation.

The left and right ultrasound sensors 11 and 12 may be located at the same level in the right end portion on the rear surface 52 of the truck 50. The transceiver circuit 13 which is connected to the left and right ultrasound sensors 11 and 12 may be mounted in the truck 50 along with the arithmetic unit 17 which is connected to the transceiver circuit 13. In this modification, ultrasound waves from the left and right ultrasound sensors 11 and 12 are reflected at the front surface 61 of the truck 60, and then are received by the left and right ultrasound sensors 11 and 12. In the same way as the first embodiment, when the trucks 50 and 60 are deviated from each other in the right and left direction RLD, a difference between intensities I1 and I2 of reflected waves received by the left and right ultrasound sensors 11 and 12 occurs depending on the direction and amount D of deviation.

Therefore, in the same way as the first embodiment, the direction and amount D of deviation of the truck 50 with respect to the truck 60 can be detected. In this case, from the detected direction and amount D of deviation of the truck 50 with respect to the truck 60, the direction and amount D of deviation of the truck 60 with respect to the truck 50 can be detected. The detected direction and amount D of deviation of the truck 60 with respect to the truck 50 are transmitted from the truck 60 to the truck 50 by vehicle-to-vehicle communication. This makes it possible to allow the truck 60 to follow the truck 50. In this modification, a relative position detection device is mounted in the truck 60 and is used for allowing a following vehicle to follow the truck 50.

(Second Embodiment)

Figure 8:
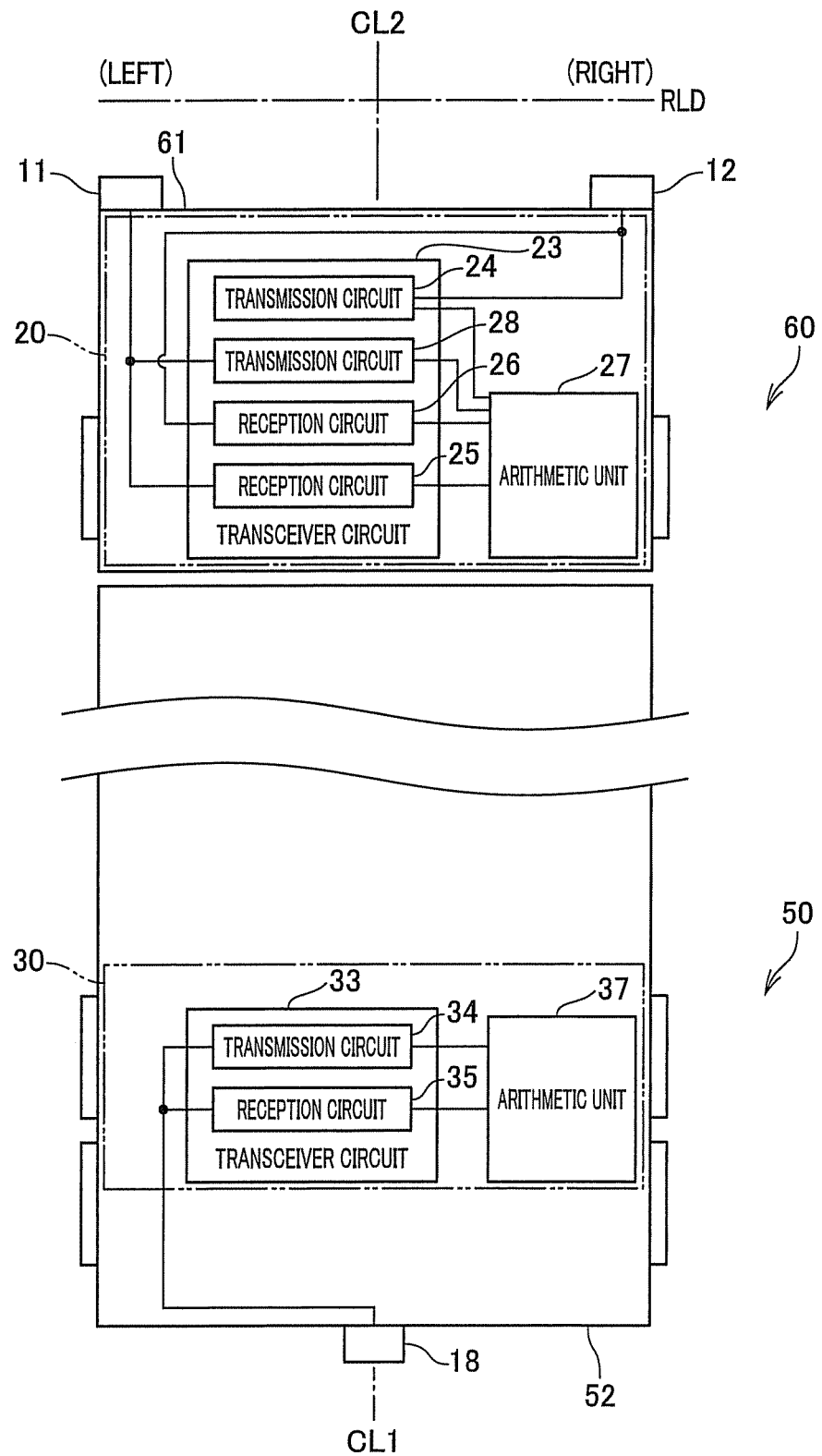
FIG. 8 is a block diagram of a relative position detection device for a vehicle according to a second embodiment and a plan view of the vehicle.

With reference to FIG. 8, a configuration of a relative position detection device for a vehicle according to a second embodiment is described.

This relative position detection device of the second embodiment includes first and second ultrasound sensors (hereafter referred to as "left and right ultrasound sensors") 11 and 12 forming a sensor pair, a center ultrasound sensor 18, a second device body 20, and a third device body 30. The second device body 20 is provided with a transceiver circuit (hereafter referred to as "second transceiver circuit") 23 and an arithmetic unit (calculation unit) (hereafter referred to as "second arithmetic unit") 27. The third device body 30 is provided with a transceiver circuit (hereafter referred to as "third transceiver circuit") 33, and an arithmetic unit (calculation unit) (hereafter referred to as "third arithmetic unit") 37.

The left and right ultrasound sensors 11 and 12, the second transceiver circuit 23 and the second arithmetic unit 27 are mounted in a truck (second vehicle) 60 following a preceding truck (first vehicle) 50. The center ultrasound sensor 18, the third transceiver circuit 33 and the third arithmetic unit 37 are mounted in the preceding truck 50.

The truck 60 may act as the first vehicle with respect to another vehicle (e.g., truck) following the truck 60. In this case, the truck 60 may be also provided with the third transceiver circuit 33, the third arithmetic unit 37, and the center ultrasound sensor 18 acting as a center ultrasound sensor for a relative position detection device that detects a relative position between the truck 60 and another vehicle following the truck 60.

The truck 50 may act as the second vehicle with respect to another vehicle (e.g., truck) preceding the truck 50. In this case, the truck 50 may be also provided with the second transceiver circuit 23, the second arithmetic unit 27, and the left and right ultrasound sensors 11 and 12 acting as the left and right ultrasound sensors for a relative position detection device that detects a relative position between the truck 50 and another vehicle preceding the truck 50.

The left and right ultrasound sensors 11 and 12 are located at the same height in the left and right end portions (placed at right and left positions, symmetrical with respect to the center line CL2 of the vehicle body) on the front surface 61 of the truck 60. The center ultrasound sensor 18 is located in the center portion on the rear surface 52 of the truck 50. At least one of the left and right ultrasound sensors 11 and 12 emits pulsed waves (second ultrasound waves corresponding to second transmission waves) from its located position in its front direction. Upon receiving the second ultrasound wave from the at least one of the left and right ultrasound sensors 11 and 12, the center ultrasound sensor 18 emits pulsed waves (first ultrasound waves corresponding to first transmission waves) from its located positions in its front direction, i.e., toward the left and right ultrasound sensors 11 and 12.

The left and right ultrasound sensors 11, 12 and the center ultrasound sensor 18 may not be located at the same height as each other. The center ultrasound sensor 18 may be located such that the diffusion range DR3 in the horizontal direction of the first ultrasound waves emitted from the center ultrasound sensor 18 on the rear surface 52 of the truck 50 covers the height of the left and right ultrasound sensors 11 and 12 on the front surface 61 of the truck 60.

The second transceiver circuit 23 includes transmission circuits 24 and 28 and reception circuits 25 and 26. The transmission circuits 28 and 24 are electrically connected to the left and right ultrasound sensors 11 and 12, respectively. At least one of transmission circuits 28 and 24 applies an electrical signal to the corresponding ultrasound sensor such that the second ultrasound waves are emitted from the corresponding ultrasound sensor. The reception circuits 25 and 26 are electrically connected to the left and right ultrasound sensors 11 and 12, respectively, and detect, as electrical signal, the first ultrasound waves received by the left and right ultrasound sensors 11 and 12.

The second arithmetic unit 27 is electrically connected to the transmission circuits 24, 28 and the reception circuits 25, 26. The second arithmetic unit 27 detects a relative position between the trucks 50 and 60 in the right and left direction RLD, based on a difference $\Delta T$ between reception times T1 and T2 from when the second ultrasound waves are emitted from the left and right ultrasound sensors 11 and 12 until when the first ultrasound waves are received by the left and right ultrasound sensors 11 and 12, i.e., until when a received signal is detected by the reception circuits 25 and 26.

For example, the second arithmetic unit 27 is configured as a known microcomputer including a central processing unit (CPU), a read-only memory (ROM), a random access memory (RAM), and the like. The CPU performs a process to detect a relative position between the trucks 50 and 60 in the right and left direction RLD described hereafter, using programs stored in the ROM, programs loaded into the RAM, and the like.

The third transceiver circuit 33 includes a transmission circuit 34 and a reception circuit 35. The third arithmetic unit 37 is electrically connected to the transmission circuit 34 and the reception circuit 35. The reception circuit 35 detects, as an electrical signal, the second ultrasound waves received by the center ultrasound sensor 18 and transmit the detected electrical signal to the third arithmetic unit 37. Upon receiving the detected electrical signal from the reception circuit 35, the third arithmetic unit 37 allows the transmission circuit 34 to apply an electrical signal to the center ultrasound sensor 18. The transmission circuit 34 applies electrical signal to the center ultrasound sensor 18 such that pulses of the first ultrasound waves are emitted from the center ultrasound sensor 18.

Figure 9:
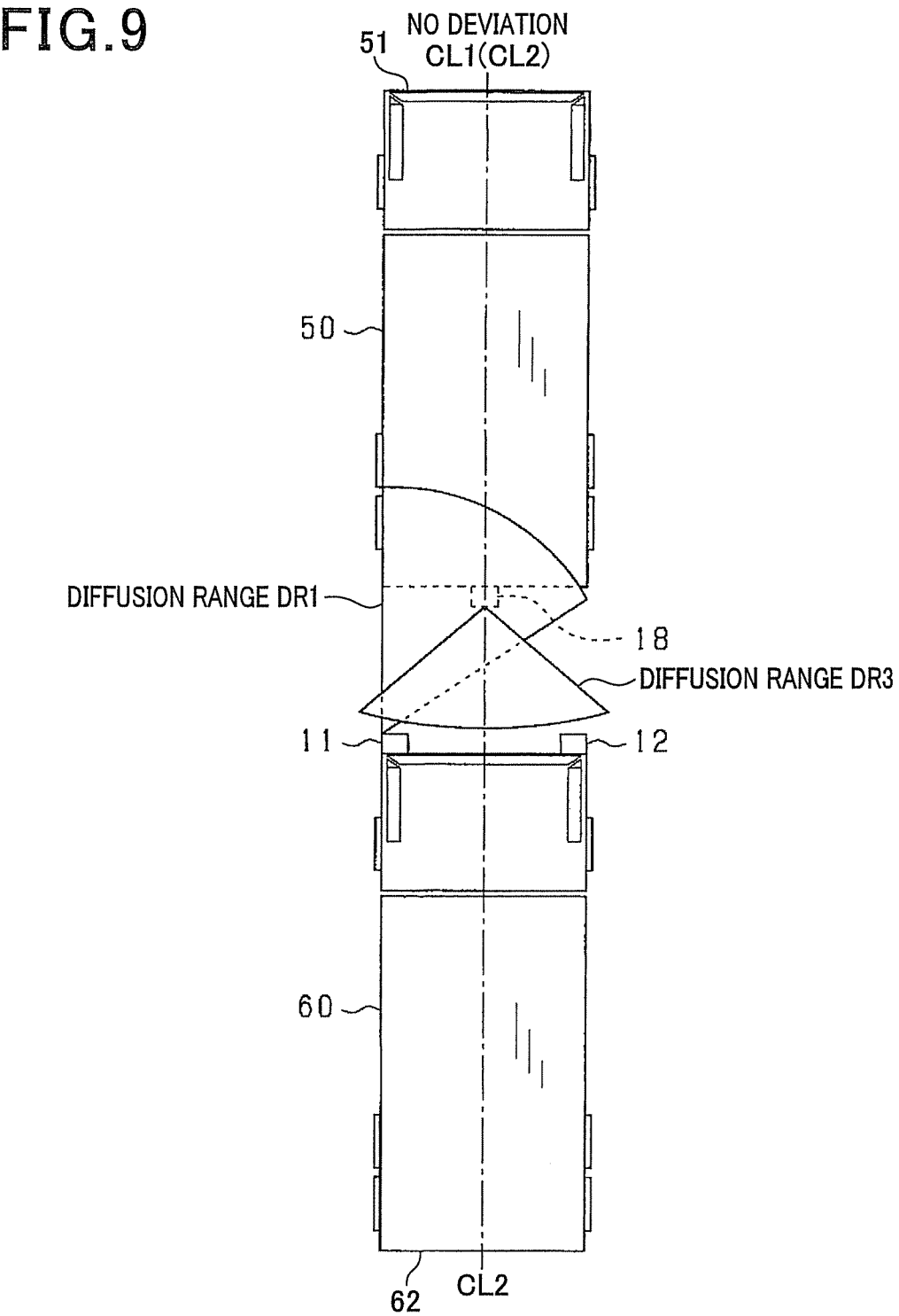
FIG. 9 is a plan view of a preceding truck and a following truck that are not deviated from each other in the right and left direction according to the second embodiment.
Figure 10:
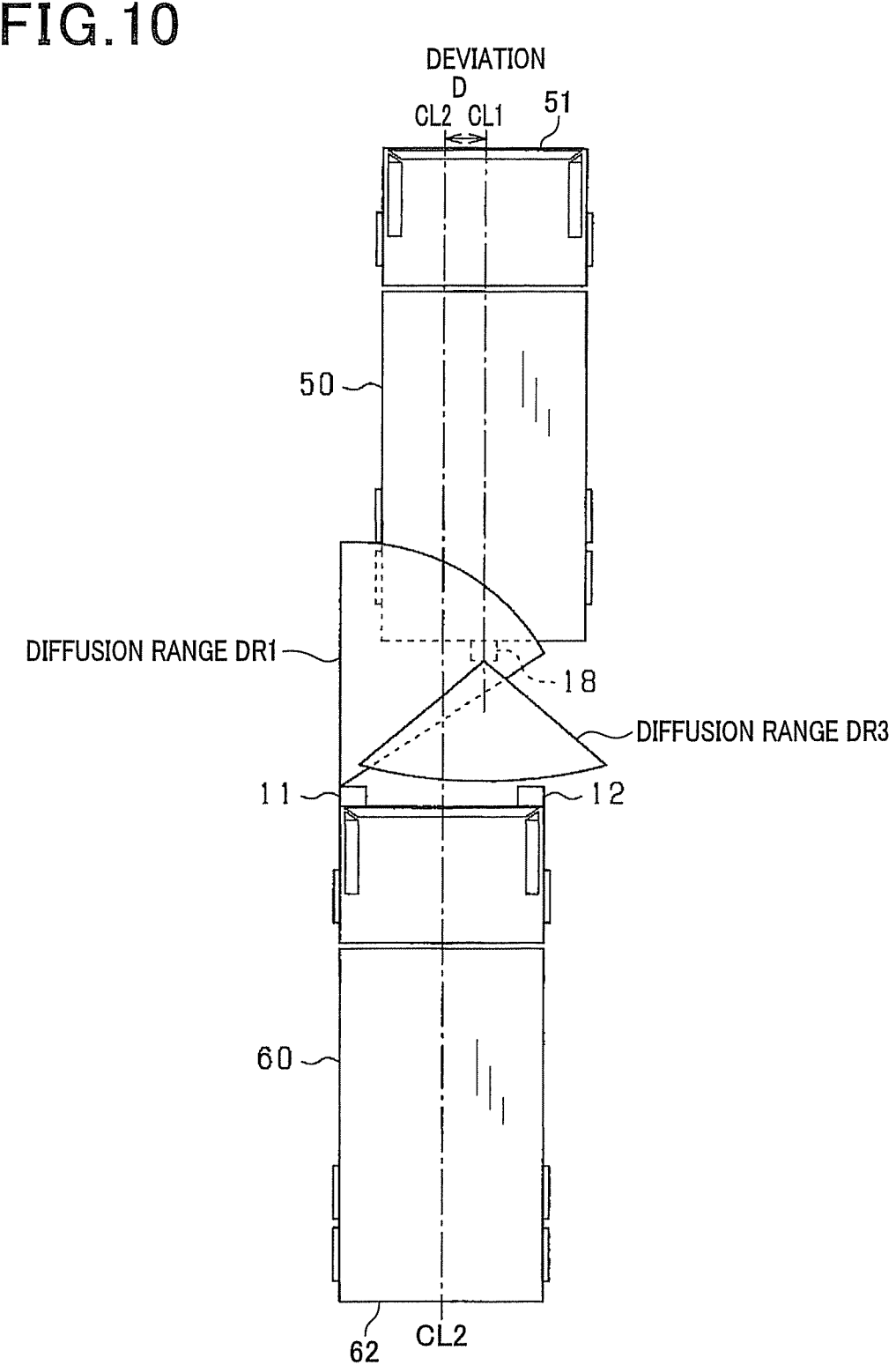
FIG. 10 is a plan view of a preceding truck and a following truck that are deviated from each other in the right and left direction according to the second embodiment.
Figure 11:
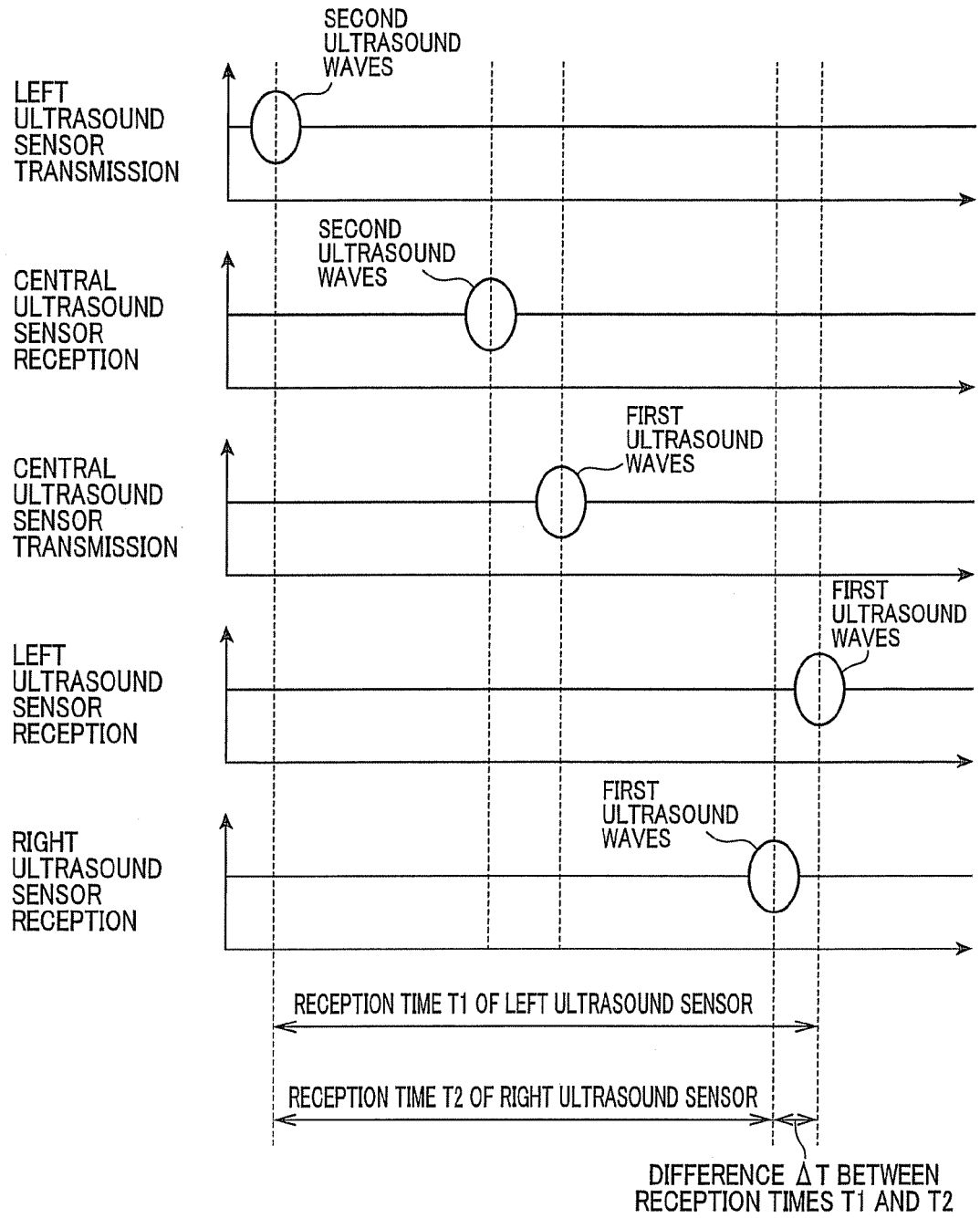
FIG. 11 is a timing chart showing times until when first ultrasound waves are received by each of a left and right ultrasound sensors according to the second embodiment.

Next, with reference to FIGS. 9 to 11, a technique for detecting a relative position between the trucks 50 and 60 in the right and left direction RLD is described in detail.

FIG. 9 shows a relationship of a relative position between the trucks 50 and 60 in the right and left direction RLD when the trucks 50 and 60 are not deviated from each other in the right and left direction RLD (the center line CL1 of the vehicle body of the truck 50 coincides with the center line CL2 of the vehicle body of the truck 60). FIG. 10 shows a relationship of a relative position between the trucks 50 and 60 in the right and left direction RLD when the trucks 50 and 60 are deviated from each other in the right and left direction RLD (the center line CL1 of the truck 50 does not coincide with the center line CL2 of the truck 60). FIG. 11 shows times T1 and T2 from when the second ultrasound waves are emitted from the left ultrasound sensor 11 until when the first ultrasound waves from the center ultrasound1 sensor 18 are received by the left and right ultrasound sensors 11 and 12.

As shown in FIG. 9, when the trucks 50 and 60 are not deviated from each other in the right and left direction RLD, a distance between the center ultrasound sensor 18 and the left ultrasound sensor 11 is equal to a distance between the center ultrasound sensor 18 and the right ultrasound sensor 12. Therefore, a time T1 from when second ultrasound waves are emitted from the left ultrasound sensor 11 until when first ultrasound waves from the center ultrasound1 sensor 18 are received by the left ultrasound sensor 11 is equal to a time T2 from when second ultrasound waves are emitted from the left ultrasound sensor 11 until when first ultrasound waves from the center ultrasound1 sensor 18 are received by the right ultrasound sensor 12.

As shown in FIG. 10, when the truck 50 is deviated from the truck 60 in the left direction, a distance between the center ultrasound sensor 18 and the left ultrasound sensor 11 is longer than a distance between the center ultrasound sensor 18 and the right ultrasound sensor 12. Therefore, the time T1 from when second ultrasound waves are emitted from the left ultrasound sensor 11 until when first ultrasound waves from the center ultrasound1 sensor 18 are received by the left ultrasound sensor 11 is longer than the time T2 from when second ultrasound waves are emitted from the left ultrasound sensor 11 until when first ultrasound waves from the center ultrasound1 sensor 18 are received by the right ultrasound sensor 12.

On the other hand, when the truck 50 is deviated from the truck 60 in the right direction, a distance between the center ultrasound sensor 18 and the right ultrasound sensor 12 is longer than a distance between the center ultrasound sensor 18 and the left ultrasound sensor 11. Therefore, the time T2 from when the second ultrasound waves are emitted from the left ultrasound sensor 11 until when the first ultrasound waves from the center ultrasound sensor 18 are received by the right ultrasound sensor 12 is longer than the time T1 from when the second ultrasound waves are emitted from the left ultrasound sensor 11 until when the first ultrasound waves from the center ultrasound1 sensor 18 are received by the left ultrasound sensor 11.

Thus, a difference $\Delta T$ between the times T1 and T2 from when the second ultrasound waves are emitted from the left ultrasound sensor 11 until when the first ultrasound waves are received by the left and right ultrasound sensors 11 and 12 occurs depending on the direction and amount D of deviation between the trucks 50 and 60 in the right and left direction RLD (corresponding to a distance between the center lines CL1 and CL2 as shown in FIG. 10). Accordingly, the arithmetic unit 27 detects the direction and amount D of deviation between the trucks 50 and 60 in the right and left direction RLD, based on the difference $\Delta T$ between the times T1 and T2 from when the second ultrasound waves are emitted from the left ultrasound sensor 11 until when the first ultrasound waves are received by the left and right ultrasound sensors 11 and 12.

Specifically, as the direction of deviation of the truck 60 provided with the left and right ultrasound sensors 11 and 12, the arithmetic unit 27 detects the sensor-located side at which the left or right ultrasound sensor 11 or 12 having the longer of times until when the first ultrasound waves are received is located. For example, when the time T1 until when the first ultrasound waves are received by the left ultrasound sensor 11 is longer than the time T2 until when the first ultrasound waves are received by the right ultrasound sensor 12, the arithmetic unit 27 detects that the truck 60 is deviated in the left direction with respect to the truck 50 with reference to the front direction of the left and right ultrasound sensors 11 and 12.

Furthermore, a correlation (for example, correlation map or relational expression) between (i) a difference $\Delta T=|T1-T2|$ between times T1 and T2 until when the first ultrasound waves are received by the left and right ultrasound sensors 11 and 12 and (ii) an amount D of deviation in the right and left direction RLD between the trucks 50 and 60 is prepared in advance and held in the arithmetic unit 17 (for example, the ROM). Then, the arithmetic unit 27 applies the difference $\Delta T$ between the times T1 and T2 to the prepared correlation, and then detects the amount D of deviation in the right and left direction RLD between the trucks 50 and 60.

Instead of times T1 and T2, times from when the first ultrasound waves are emitted from the center ultrasound sensor 18 until when the first ultrasound waves are received by the left and right ultrasound sensors 11 and 12 may be obtained to detect the amount D of deviation in the right and left direction RLD between the trucks 50 and 60.

In this case, the truck 50 may transfer, to the truck 60, information of the timing on when the first ultrasound waves are emitted so as to obtain times from when the first ultrasound waves are emitted from the center ultrasound sensor 18 until when the first ultrasound waves are received by the left and right ultrasound sensors 11 and 12.

Based on the times from when the first ultrasound waves are emitted from the center ultrasound sensor 18 until when the first ultrasound waves are received by the left and right ultrasound sensors 11 and 12, the second arithmetic unit 27 calculates distances between the center ultrasound sensor 18 and the left and right ultrasound sensors 11, 12.

Subsequently, the second arithmetic unit 27 calculates relative positions between the center ultrasound sensor 18 and the left and right ultrasound sensors 11, 12, based on (i) the calculated distances between the center ultrasound sensor 18 and the left and right ultrasound sensors 11, 12 and (ii) the fact that the rear surface 52 of the truck 50 provided with the center ultrasound sensor 18 is parallel to the front surface 61 of the truck 60 provided with the left and right ultrasound sensors 11 and 12.

Then, the second arithmetic unit 27 calculates (i) a distance between the trucks 50 and 60 and (ii) a relative position between the trucks 50 and 60 in the right and left direction RLD, and then detects the amount D of deviation in the right and left direction RLD between the trucks 50 and 60.

According to the second embodiment as described above, the following effects are obtained.

When the trucks 50 and 60 are not deviated from each other in the right and left direction RLD, a distance from the center ultrasound sensor 18 to the left ultrasound sensor 11 is equal to a distance from the center ultrasound sensor 18 to the right ultrasound sensor 12. However, when the trucks 50 and 60 are deviated from each other in the right and left direction RLD, a distance from the center ultrasound sensor 18 to the left ultrasound sensor 11 is different from a distance from the center ultrasound sensor 18 to the right ultrasound sensor 12.

This results in a difference $\Delta T$ between times T1 and T2 from when the second ultrasound waves are emitted from at least one of the left and right ultrasound sensors 11 and 12 (or from when the first ultrasound waves are emitted from the center ultrasound sensor 18) until when the first ultrasound waves from the center ultrasound sensor 18 are received by the left and right ultrasound sensors 11 and 12, depending the direction of deviation between the trucks 50 and 60 in the right and left direction RLD.

Thus, the direction of deviation between the trucks 50 and 60 in the right and left direction RLD can be detected based on the difference $\Delta T$ between times until when the first ultrasound wave from the center ultrasound sensor 18 is received by the left and right ultrasound sensors 11 and 12. Therefore, even when wide-directivity ultrasound wave is used, the relative position between the following vehicle and the preceding vehicle in the right and left direction RLD can be detected.

Since the left and right ultrasound sensors 11 and 12 receive the first ultrasound waves emitted from the center sensor 18 as not reflected waves but direct waves, reception intensity of the first ultrasound wave is larger than the case where the reflected waves are received. This makes it possible to further increase a distance at which the device is capable of detecting a relative position between the trucks 50 and 60.

As the direction of deviation of the vehicle provided with the left and right ultrasound sensors 11 and 12, it is possible to detect the sensor-located side at which the ultrasound sensor having longer of times until when the first ultrasound waves are received is located.

Based on the times from when the first ultrasound waves are emitted from the center ultrasound sensor 18 until when the first ultrasound waves are received by the left and right ultrasound sensors 11 and 12, distances between the center ultrasound sensor 18 and the left and right ultrasound sensors 11, 12 can be calculated. Subsequently, relative positions between the center ultrasound sensor 18 and the left and right ultrasound sensors 11, 12 can be calculated based on the calculated distances between the center ultrasound sensor 18 and the left and right ultrasound sensors 11, 12 That is, (i) a distance between the trucks 50 and 60 and (ii) a relative position between the trucks 50 and 60 in the right and left direction RLD are calculated. This makes it possible to detect the amount D of deviation in the right and left direction RLD between the trucks 50 and 60.

Since the first ultrasound waves are emitted from the truck 60 in response to the second ultrasound waves being emitted from the truck 60, detection timing can be controlled at a vehicle side that detects a relative position between the trucks 50 and 60 in the right and left direction RLD.

(Modifications of Second Embodiment)

The second embodiment may be modified to be worked as follows. The following modifications each may be combined as needed.

The second ultrasound waves may not be emitted from the left and right ultrasound sensors 11 and 12, but the first ultrasound waves may be emitted from the center ultrasound sensor 18 at an optional timing. According to this modification, the direction and amount D of deviation in the right and left direction RLD between the trucks 50 and 60 can be detected based on a difference between times until when the first ultrasound waves from the center ultrasound sensor 18 are received by the left and right ultrasound sensors 11 and 12.

In the same manner as the first embodiment, the direction and amount D of deviation in the right and left direction RLD between the trucks 50 and 60 can be detected based on a difference between intensities of the first ultrasound waves received by the left and right ultrasound sensors 11 and 12.

The left and right ultrasound sensors 11 and 12 may be located at the same height in the left and right end portions on the rear surface 52 of the truck 50, and the center ultrasound sensor 18 may be located in the center portion on the front surface 61 of the truck 60. In this modification, the second transceiver circuit 23 and the second arithmetic unit 27 may be mounted in the truck 50, and the third transceiver circuit 33 and the third arithmetic unit 37 may be mounted in the truck 60.

According to this, in the same manner as the second embodiment, when the trucks 50 and 60 are deviated from each other in the right and left direction RLD, a difference between times T1 and T2 until when the first ultrasound waves are received by the left and right ultrasound sensors 11 and 12 occurs depending on the direction and amount D of deviation between the trucks 50 and 60.

Therefore, the direction and amount D of deviation of the truck 50 with respect to the truck 60 in the right and left direction RLD can be detected in the same manner as the second embodiment. In this case, based on the detected direction and amount D of deviation of the truck 50 with respect to the truck 60 in the right and left direction, the direction and amount D of deviation of the truck 60 with respect to the truck 50 in the right and left direction RLD can be calculated.

The truck 60 may act as a first vehicle with respect to another vehicle (e.g., truck) following the truck 60. In this case, the truck 60 may be also provided with the second transceiver circuit 23, the second arithmetic unit 27, and the left and right ultrasound sensors 11 and 12 acting as a left and right ultrasound sensors for a relative position detection device that detects a relative position between the truck 60 and another vehicle following the truck 60.

The truck 50 may act as a second vehicle with respect to another vehicle (e.g., truck) preceding the truck 50. In this case, the truck 50 may be also provided with the third transceiver circuit 33, the third arithmetic unit 37, and the center ultrasound sensor 18 acting as a center ultrasound sensor for a relative position detection device that detects a relative position between the truck 50 and another vehicle preceding the truck 50.

(Third Embodiment)

Figure 12:
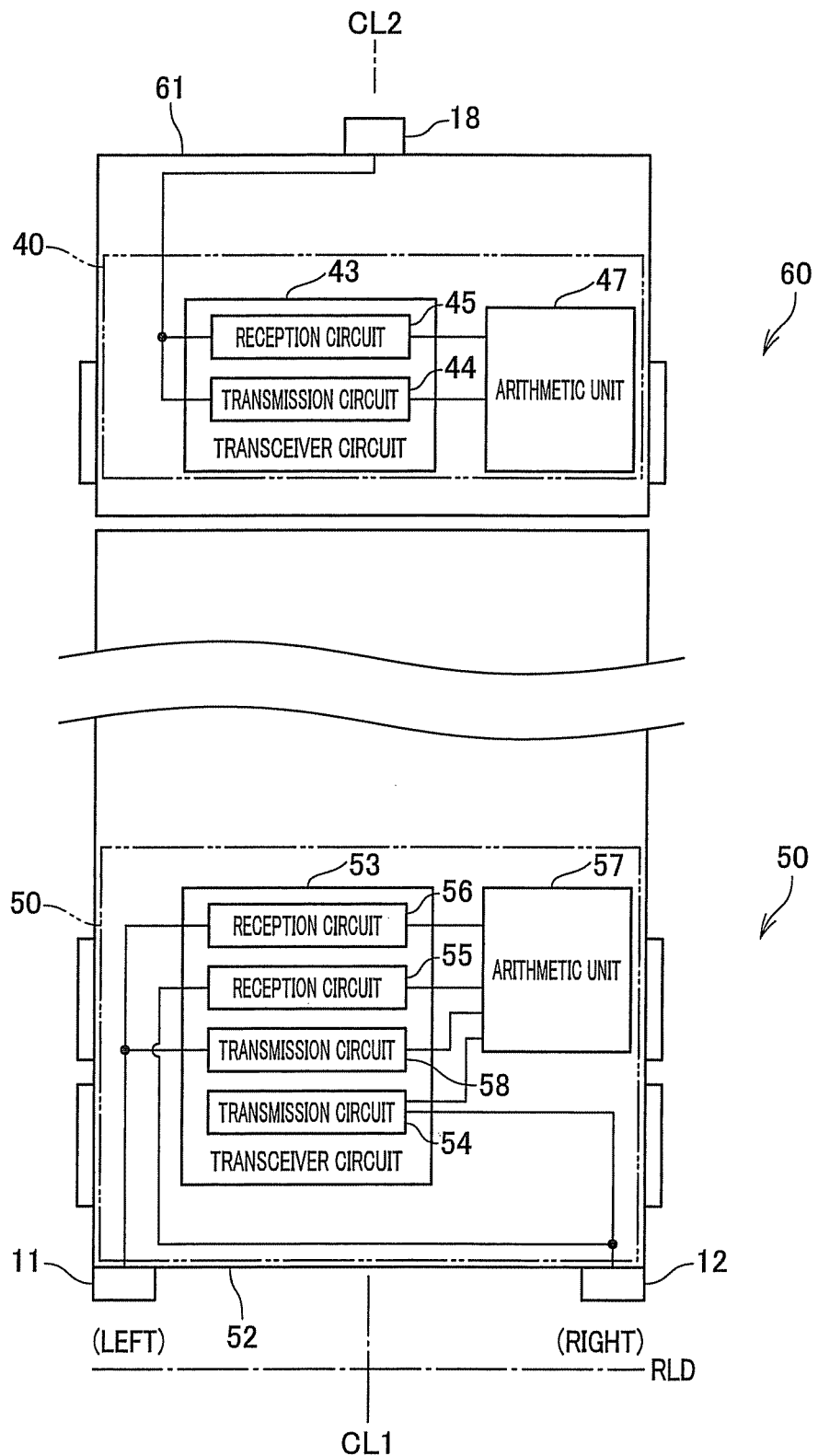
FIG. 12 is a block diagram of a relative position detection device for a vehicle according to a third embodiment and a plan view of the vehicle.

With reference to FIG. 12, a configuration of a relative position detection device for a vehicle according to a third embodiment is described.

This relative position detection device of the third embodiment includes a center ultrasound sensor 18, first and second ultrasound sensors (hereafter referred to as "left and right ultrasound sensors") 11 and 12 forming a sensor pair, a fourth device body 40, and a fifth device body 50. The fourth device body 40 is provided with a transceiver circuit (hereafter referred to as "fourth transceiver circuit") 43 and an arithmetic unit (calculation unit) (hereafter referred to as "fourth arithmetic unit") 47. The fifth device body 50 is provided with a transceiver circuit (hereafter referred to as "fifth transceiver circuit") 53 and an arithmetic unit (calculation unit) (hereafter referred to as "fifth arithmetic unit") 57.

The center ultrasound sensor 18, the fourth transceiver circuit 43 and the fourth arithmetic unit 47 are mounted in a truck (second vehicle) 60 following a preceding truck (first vehicle) 50. The left and right ultrasound sensors 11 and 12, the fifth transceiver circuit 53 and the fifth arithmetic unit 57 are mounted in the preceding truck 50.

The truck 60 may act as the first vehicle with respect to another vehicle (e.g., truck) following the truck 60. In this case, the truck 60 may be also provided with the fifth transceiver circuit 53, the fifth arithmetic unit 57, and the left and right ultrasound sensors 11 and 12 acting as the left and right ultrasound sensors for a relative position detection device that detects a relative position between the truck 60 and another vehicle following the truck 60.

The truck 50 may act as the second vehicle with respect to another vehicle (e.g., truck) preceding the truck 50. In this case, the truck 60 may be also provided with the fourth transceiver circuit 43, the fourth arithmetic unit 47, and the center ultrasound sensor 18 acting as a center ultrasound sensor for a relative position detection device that detects a relative position between the truck 50 and another vehicle preceding the truck 50.

The center ultrasound sensor 18 is located in the center portion on the front surface 61 of the truck 60. The left and right ultrasound sensors 11 and 12 are located at the same height in the left and right end portions on the rear surface 52 of the truck 50. The center ultrasound sensor 18 emits pulsed waves (first ultrasound waves corresponding to first transmission waves) from its located position in its front direction, i.e., toward the left and right ultrasound sensors 11 and 12. Immediately or after a predetermined period of time has elapsed after the first ultrasound waves are received, the left and right ultrasound sensors 11 and 12 emit pulsed waves (second ultrasound waves corresponding to second transmission waves), which are discriminable from each other, from their located positions in their front directions.

The left and right ultrasound sensors 11, 12 and the center ultrasound sensor 18 may not be located at the same height as each other. The center ultrasound sensor 18 may be located such that the diffusion range in the horizontal direction of the first ultrasound waves emitted from the center ultrasound sensor 18 on the front surface 61 of the truck 60 covers the height of the left and right ultrasound sensors 11 and 12 on the rear surface 52 of the truck 50.

The fourth transceiver circuit 43 includes a transmission circuit 44 and a reception circuit 45. The transmission circuit 44 applies an electric signal to the center ultrasound sensor 18 such that the second ultrasound waves are emitted from the center ultrasound sensor 18. The reception circuit 45 detects, as electrical signal, the second ultrasound waves, which are emitted from the left and right ultrasound sensors 11 and 12 and are received by the center ultrasound sensor 18, and sends the detected electrical signal to the fourth arithmetic unit 47.

The fourth arithmetic unit 47 detects a relative position between the trucks 50 and 60 in the right and left direction RLD, based on a difference between (i) a time from when the first ultrasound waves are emitted from the center ultrasound sensor 18 until when the second ultrasound waves emitted from the left ultrasound sensor 11 is received by the center ultrasound sensor 18 and (ii) a time from when the first ultrasound waves are emitted from the center ultrasound sensor 18 until when the second ultrasound waves emitted from the right ultrasound sensor 12 are received by the center ultrasound sensor 18.

For example, the fourth arithmetic unit 47 is configured as a known microcomputer including a central processing unit (CPU), a read-only memory (ROM), a random access memory (RAM), and the like. The CPU performs a process to detects a relative position between the trucks 50 and 60 in the right and left direction RLD described hereafter, using programs stored in the ROM, programs loaded into the RAM, and the like.

The fifth transceiver circuit 53 includes transmission circuits 54, 58 and reception circuits 55, 56. The fifth arithmetic unit 57 is electrically connected to the transmission circuits 54, 58 and the reception circuits 55, 56. The reception circuits 56 and 55 detect, as electrical signals, the first ultrasound waves received by the left and right ultrasound sensors 11 and 12, and sends the detected electrical signals to the fifth arithmetic unit 57.

Upon receiving the electrical signals detected by the reception circuits 55 and 56, the fifth arithmetic unit 57 allows the transmission circuits 58 and 54 to transmit electrical signals to the left and right ultrasound sensors 11 and 12, immediately or after a predetermined period of time has elapsed after the electrical signals from the reception circuits 55 and 56 are received. The transmission circuits 58 and 54 apply electrical signals to the left and right ultrasound sensors 11 and 12 such that the second ultrasound waves, emitted from the left and right ultrasound sensors 11 and 12 respectively, are discriminable from each other. Specifically, the left and right ultrasound sensors 11 and 12 emit, as the second ultrasound waves, pulsed waves which are different in frequency or coding method from each other.

Figure 13:
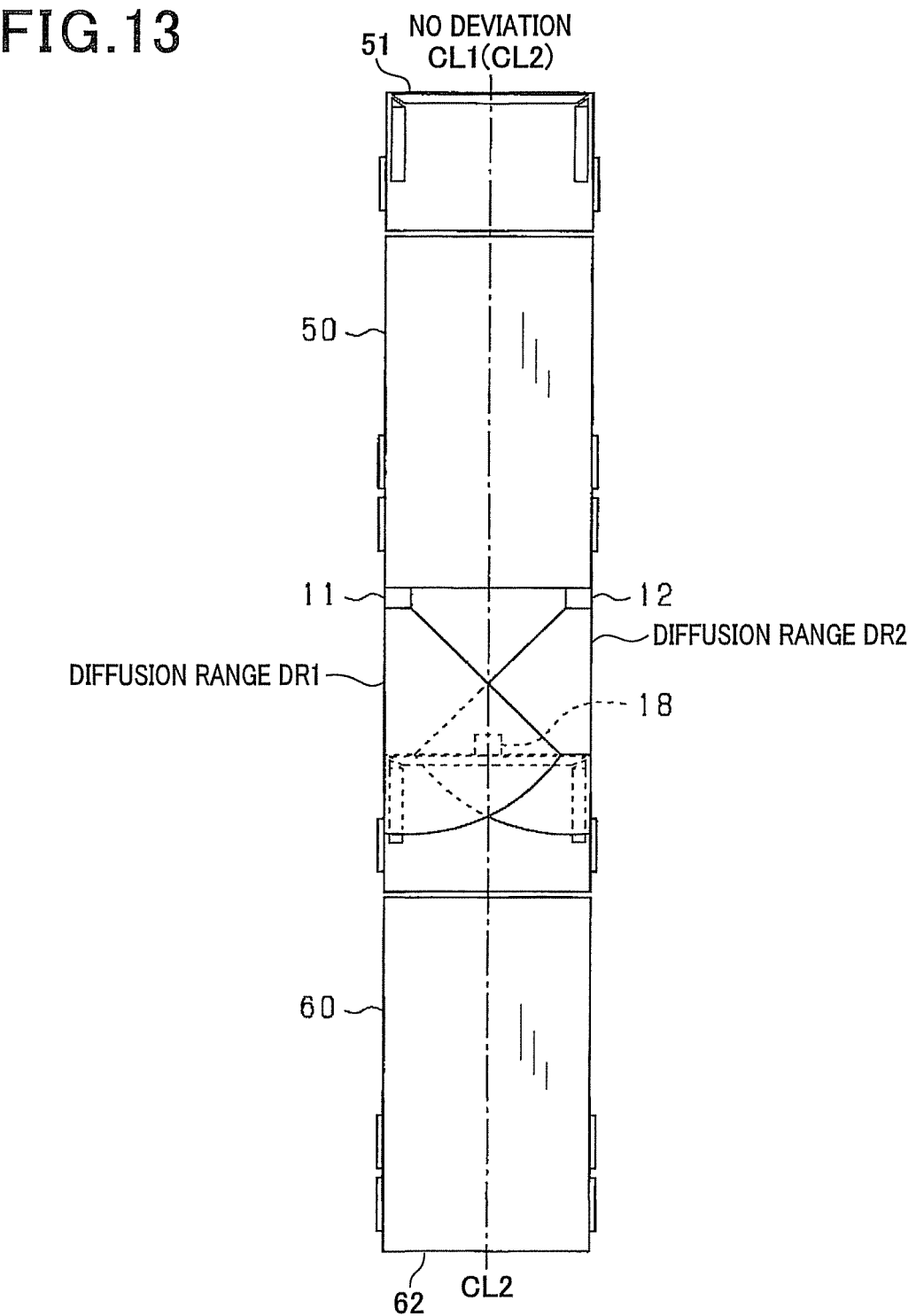
FIG. 13 is a plan view of a preceding truck and a following truck that are not deviated from each other in the right and left direction according to the third embodiment.
Figure 14:
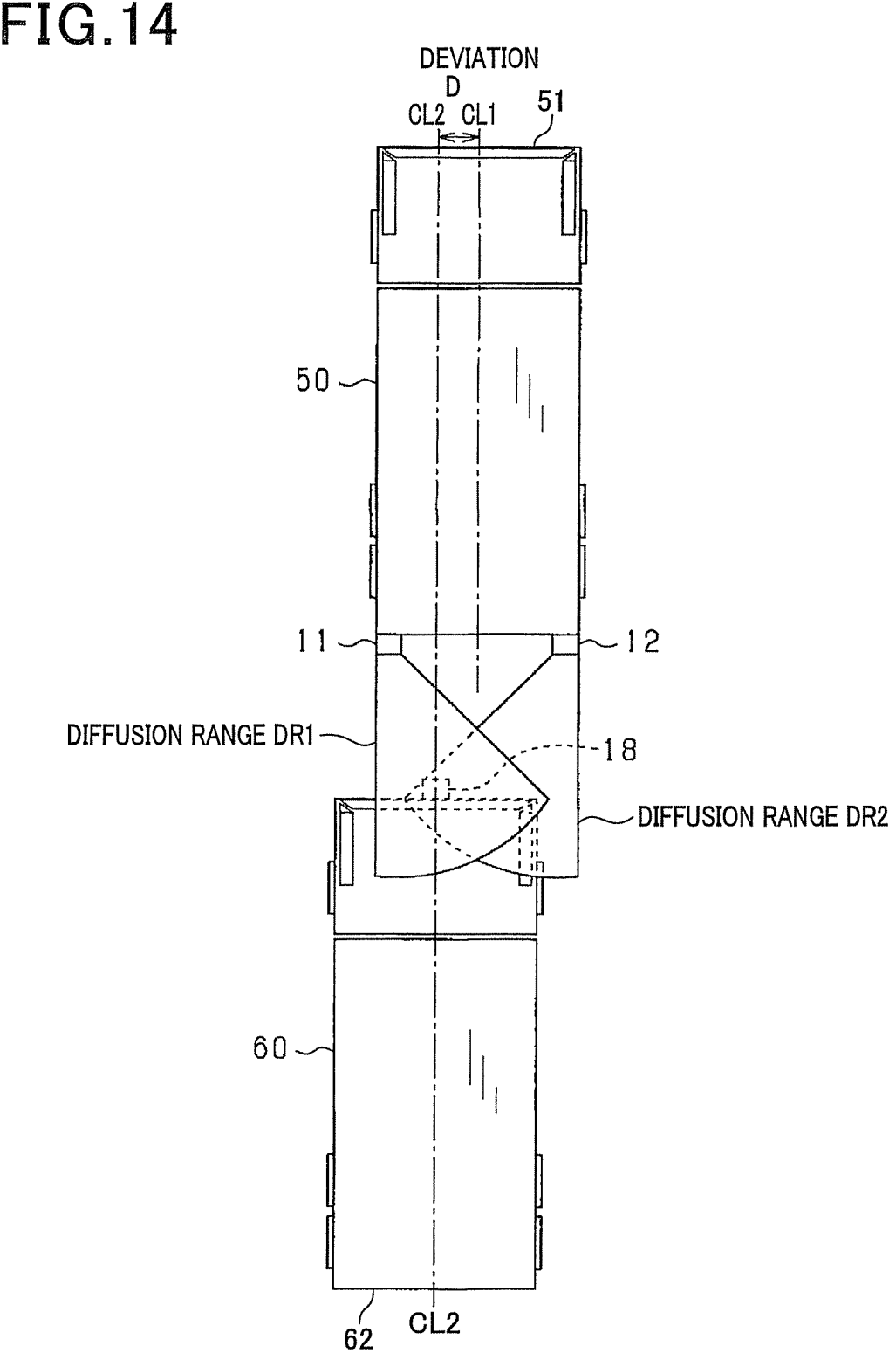
FIG. 14 is a plan view of a preceding truck and a following truck that are deviated from each other in the right and left direction according to the third embodiment.

Next, with reference to FIGS. 13 and 14, a technique for detecting a relative position between the trucks 50 and 60 in the right and left direction RLD is described in detail.

FIG. 13 shows a relationship of a relative position between the trucks 50 and 60 in the right and left direction RLD when the trucks 50 and 60 are not deviated from each other in the right and left direction RLD (the center line CL1 of the vehicle body of the truck 50 coincides with the center line CL2 of the vehicle body of the truck 60). FIG. 14 shows a relationship of a relative position between the trucks 50 and 60 in the right and left direction RLD when the trucks 50 and 60 are deviated from each other in the right and left direction RLD (the center line CL1 of the vehicle body of the truck 50 does not coincide with the center line CL2 of the vehicle body of the truck 60).

As shown in FIG. 13, when the trucks 50 and 60 are not deviated from each other in the right and left direction RLD, a distance between the center ultrasound sensor 18 and the left ultrasound sensor 11 is equal to a distance between the center ultrasound sensor 18 and the right ultrasound sensor 12.

Therefore, a time from when the first ultrasound waves are emitted from the center ultrasound sensor 18 until when the second ultrasound waves from the left ultrasound1 sensor 11 are received by the center ultrasound sensor 18 is equal to a time from when the first ultrasound waves are emitted from the center ultrasound sensor 18 until when the second ultrasound waves from the right ultrasound1 sensor 12 are received by the center ultrasound sensor 18.

As shown in FIG. 14, when the truck 50 is deviated from the truck 60 in the left direction, a distance between the center ultrasound sensor 18 and the right ultrasound sensor 12 is longer than a distance between the center ultrasound sensor 18 and the left ultrasound sensor 11.

Therefore, a time from when the first ultrasound waves are emitted from the center ultrasound sensor 18 until when the second ultrasound waves are emitted from the right ultrasound1 sensor 12 is longer than a time from when the first ultrasound waves are emitted from the center ultrasound sensor 18 until when the second ultrasound waves are emitted from the left ultrasound1 sensor 11. From this, a timing at which the second ultrasound waves are emitted from the right ultrasound sensor 12 becomes later than a timing at which the second ultrasound waves are emitted from the left ultrasound sensor 11.

Thus, the second ultrasound waves from the right ultrasound sensor 12 are emitted at the timing later than the timing at which the second ultrasound waves from the left ultrasound sensor 11 are emitted. At the same time, the transfer distance of the second ultrasound waves from the right ultrasound sensor 12 is longer that of the second ultrasound waves from the left ultrasound sensor 11.

Therefore, a time from when the first ultrasound waves are emitted from the center ultrasound sensor 18 until when the second ultrasound waves from the right ultrasound1 sensor 12 are received by the center ultrasound sensor 18 is longer than a time from when the first ultrasound waves are emitted from the center ultrasound sensor 18 until when the second ultrasound waves from the left ultrasound1 sensor 11 are received by the center ultrasound sensor 18.

On the other hand, when the truck 50 is deviated from the truck 60 in the right direction, a distance between the center ultrasound sensor 18 and the left ultrasound sensor 11 is longer than a distance between the center ultrasound sensor 18 and the right ultrasound sensor 12. Therefore, a time from when the first ultrasound waves are emitted from the center ultrasound sensor 18 until when the second ultrasound waves from the left ultrasound sensor 11 are received by the center ultrasound sensor 18 is longer than a time from when the first ultrasound waves are emitted from the center ultrasound sensor 18 until when the second ultrasound waves from the right ultrasound1 sensor 12 are received by the center ultrasound sensor 18.

Thus, a difference between the times from when the first ultrasound waves are emitted from the center ultrasound sensor 18 until when the second ultrasound waves from the left and right ultrasound sensors 11 and 12 are received by the center ultrasound sensor 18 occurs depending on the direction and amount D of deviation between the trucks 50 and 60 in the right and left direction RLD (corresponding to a distance between the center lines CL1 and CL2 as shown in FIG. 14). Accordingly, the arithmetic unit 47 detects the direction and amount D of deviation between the trucks 50 and 60 in the right and left direction RLD based on the difference between the times from when the first ultrasound waves are emitted from the center ultrasound sensor 18 until when the second ultrasound waves from the left and right ultrasound sensors 11 and 12 are received by the center ultrasound sensor 18.

Specifically, as the direction of deviation of the truck 50 provided with the left and right ultrasound sensors 11 and 12, the arithmetic unit 47 detects the sensor-located side at which the ultrasound sensor emitting the second ultrasound wave lately received by the center ultrasound sensor 18 is located. That is, as the direction of deviation of the truck 60 provided with the center ultrasound sensor 18, the arithmetic unit 47 detects the sensor-located side at which the ultrasound sensor emitting the second ultrasound waves early received by the center ultrasound sensor 18 is located.

Furthermore, a correlation (for example, correlation map or relational expression) between (i) a difference $\Delta T = |T1-T2|$ between times T1 and T2 from when the first ultrasound waves are emitted from the center ultrasound sensor 18 until when the second ultrasound waves are received by the center ultrasound sensors 18 and (ii) an amount D of deviation in the right and left direction RLD between the trucks 50 and 60 is prepared in advance and held in the arithmetic unit 17 (for example, the ROM). Then, the arithmetic unit 47 applies the difference $\Delta T$ between the times T1 and T2 to the prepared correlation, and then detects the amount D of deviation in the right and left direction RLD between the trucks 50 and 60.

According to the third embodiment as described above, the following effects are obtained.

When the trucks 50 and 60 are deviated from each other in the right and left direction RLD, a distance from the center ultrasound sensor 18 to the left ultrasound sensor 11 is different from a distance from the center ultrasound sensor 18 to the right ultrasound sensor 12. This results in a difference between times from when the first ultrasound waves are emitted from the center ultrasound sensor 18 until when the second ultrasound waves from the left and right ultrasound sensors 11 and 12 are received by the center ultrasound sensor 18, depending the direction of deviation between the trucks 50 and 60 in the right and left direction RLD.

Thus, the direction of deviation between the trucks 50 and 60 in the right and left direction RLD can be detected based on the difference between times from when the first ultrasound waves are emitted from the center ultrasound sensor 18 until when the first ultrasound waves from the left and right ultrasound sensors 11 and 12 are received by the center ultrasound sensor 18. Therefore, even when wide-directivity ultrasound waves are used, the relative position between the following vehicle and the preceding vehicle in the right and left direction RLD can be detected.

As the direction of deviation of the vehicle provided with the left and right ultrasound sensors 11 and 12, it is possible to detect the sensor-located side at which the ultrasound sensor having the longer time from when the first ultrasound waves are emitted until when the second ultrasound waves from the left and right ultrasound sensors 11 and 12 are received.

(Modifications of Third Embodiment)

The first ultrasound waves may not be emitted from the center ultrasound sensor 18, but the second ultrasound waves may be emitted from the left and right ultrasound sensors 11 and 12 at the same timing. According to this modification, the direction and amount D of deviation in the right and left direction RLD between the trucks 50 and 60 can be detected based on a difference between times until when the second ultrasound waves from the left and right ultrasound sensors 11 and 12 are received by the center ultrasound sensors 18.

(Other Embodiments)

The present invention are not limited to the above-described embodiments, and may be modified to be worked as follows.

As substitute for the ultrasound sensors 11, 12 and 18, radars for transmitting electromagnetic waves, for example, millimeter-wave radars may be used.

The relative position detection device for a vehicle according to the embodiments as described above may be applicable to a travelling system that allows a first and second buses to travel in such a manner that the first bus precedes and the second bus follows the first bus.

What is claimed is:

1. A relative position detection device that is applied to a traveling system that allows first and second vehicles to travel in such a manner that the first vehicle precedes and the second vehicle follows the first vehicle, the detecting device comprising:

a sensor pair of first and second sensors that are located in a right and left direction at the same height on right and left end portions of at least one of a rear surface of the first vehicle and a front surface of the second vehicle, the first and second sensors emitting transmission waves from their located positions in their front directions and receiving their reflected waves; and an arithmetic unit that compares a first intensity of the reflected waves received by the first sensor and a second intensity of the reflected waves received by the second sensor, and detects a direction of deviation between the first and second vehicles in the right and left direction on the basis of a difference between the first intensity of the reflected waves received by the first sensor and the second intensity of the reflected waves received by the second sensor.

2. The relative position detection device according to claim 1, wherein the arithmetic unit is configured to:

prepare a correlation between the difference between the first and second intensities of the reflected waves and an amount of deviation between the first and second vehicles in the right and left direction in advance; and apply the first and second intensities of the reflected waves to the prepared correlation so as to detect the amount of deviation between the first and second vehicles.

3. The relative position detection device according to claim 1, wherein the arithmetic unit detects, as the direction of deviation of the first or second vehicle provided with the first and second ultrasound sensors, a located side at which the first or second ultrasound sensor receiving the reflected waves with smaller intensity of reflected waves received by the left and right ultrasound sensors is located.

4. The relative position detection device according to claim 1, further comprising:

a first sensor pair of the first and second sensors; and a second sensor pair of a third and fourth sensors that are located nearer to a center line of a vehicle body than the first sensor pair by a predetermined distance, the third and fourth sensors emitting transmission waves from their located position in their front directions and receiving their reflected waves, the transmission waves having an overlap of their diffusion ranges narrower than a predetermined range,
wherein one of the first and second sensor pairs emits transmission waves depending on a width of the first or second vehicle facing the first and second sensor pairs and receives its reflected waves.

5. The relative position detection device according to claim 1, wherein
the first and second sensors are configured by ultrasound sensors that emit and receive ultrasound waves.

6. The relative position detection device according to claim 1, wherein
the first and second sensors are provided on an upper end portion of at least one of the first and second vehicle.

7. The relative position detection device according to claim 6, further comprising:
a first sensor pair of the first and second sensors; and
a third sensor pair of a fifth and sixth sensors that are located at a vertically lower side by a predetermined distance from than the first sensor pair by a predetermined distance, the fifth and sixth sensors emitting transmission waves from their located position in their front directions and receiving their reflected waves,
the arithmetic unit determining that a third vehicle facing the first or second vehicle provided with the third sensor pair is present when reflected waves of the transmission waves emitted from the first sensor pair are not received by the first sensor pair and reflected wave of the transmission waves emitted from the third sensor pair are received by the third sensor pair.

8. The relative position detection device according to claim 1, wherein
the first and second sensors transmit the transmission wave such that a half of diffusion range in a horizontal direction of the transmission waves covers the rear surface of the first vehicle or the front surface of the second vehicle.

9. The relative position detection device according to claim 1, wherein
the first and second sensors are configured by radars that emit and receive electromagnetic waves.

10. The relative position detection device according to claim 1, wherein
the first and second sensors are located at the front surface of the second vehicle; and
the arithmetic unit is mounted in the second vehicle.

11. A relative position detection device that is applied to a traveling system that allows first and second vehicles to travel in such a manner that the first vehicle precedes and the second vehicle follows the first vehicle, the detecting device comprising:
a sensor pair of a first and second sensors that are located in a right and left direction at the same height on right and left end portions of at least one of a rear surface of the first vehicle and a front surface of the second vehicle, the first and second sensors emitting transmission waves formed of pulsed waves from their located positions in their front directions and receiving their reflected waves; and
an arithmetic unit that compares a first pulse length of the reflected waves received by the first sensor and a second pulse length of the reflected waves received by the second sensor, and detects a direction of deviation between the first and second vehicles in the right and left direction on the basis of a difference between the first pulse length of the reflected waves received by the first sensor and the second pulse length of the reflected waves received by the second sensor.

12. The relative position detection device according to claim 11, wherein
the arithmetic unit is configured to:
prepare a correlation between the difference between the first and second pulse lengths of the reflected waves and an amount of deviation between the first and second vehicles in the right and left direction in advance; and
apply the first and second pulse lengths of the reflected waves to the prepared correlation so as to detect the amount of deviation between the first and second vehicles.

13. The relative position detection device according to claim 11, wherein
the first and second sensors are located at the front surface of the second vehicle; and
the arithmetic unit is mounted in the second vehicle.

14. A relative position detection device that is applied to a traveling system that allows first and second vehicles to travel in such a manner that the first vehicle precedes and the second vehicle follows the first vehicle, the detecting device comprising:
a center sensor that is located at a center portion of at least one of a rear surface of the first vehicle and a front surface of the second vehicle, the center sensor emitting first transmission waves and receiving its reflected waves;
a sensor pair of a first and second sensors that are located in a right and left direction at the same height on right and left positions, symmetrical with respect to a center line of a vehicle body, of at least the other of the rear surface of the first vehicle and the front surface of the second vehicle, the first and second sensors receiving the first transmission waves; and
an arithmetic unit that detects a direction of deviation between the first and second vehicles in the right and left direction on the basis of a difference between a first time from when the first transmission waves are emitted from the center sensor until when the first transmission waves are received by the first sensor and a second time from when the first transmission waves are emitted from the center sensor until when the first transmission waves are received by the second sensor.

15. The relative position detection device according to claim 14, wherein:
at least one of the first and second sensors emit second transmission waves from its located position in a front direction; and
the center sensor emits the first transmission waves when the second transmission waves are received.

16. The relative position detection device according to claim 14, wherein
the arithmetic unit detects, as the direction of deviation of the first or second vehicle provided with the first and second ultrasound sensors, a located side at which the first or second ultrasound sensor having longer of times until when the first transmission wave is received is located.

17. The relative position detection device according to claim 14, wherein
the arithmetic unit detects an amount of deviation between the first and second vehicles in the right and left direction on times from when the first transmission waves are emitted from the center sensor until when the first transmission waves are received by the first and second sensors.

18. The relative position detection device according to claim 14, wherein
the center sensor is located at the rear surface of the first vehicle;
the first and second sensors are located at the front surface of the second vehicle; and
an arithmetic unit is mounted in the second vehicle.

19. A relative position detection device that is applied to a traveling system that allows first and second vehicles to travel in such a manner that the first vehicle precedes and the second vehicle follows the first vehicle, the detecting device comprising:
a center sensor that is located at a center portion of a front surface of the second vehicle, the center sensor emitting first transmission waves and receiving its reflected waves;
a sensor pair of a first and second sensors that are located in a right and left direction at the same height on right and left positions, symmetrical with respect to a center line of a vehicle body, of a rear surface of the first vehicle, the first and second sensors receiving the first transmission waves and emitting second transmission waves, which are discriminable from each other, from their located positions in their front directions, subsequently or after a predetermined period of time has elapsed after the first transmission waves are received; and
an arithmetic unit that detects a direction of deviation between the first and second vehicles in the right and left direction on the basis of a difference between a first time from when the first transmission waves are emitted from the center sensor until when the second transmission waves emitted from the first sensor are received by the center sensor and a second time from when the first transmission waves are emitted from the center sensor until when the second transmission waves emitted from the second sensor are received by the center sensor.

20. The relative position detection device according to claim 19, wherein
the arithmetic unit detects, as the direction of deviation of the first or second vehicle provided with the first and second ultrasound sensors, a located side at which the first or second ultrasound sensor emitting the second transmission waves with a longer time from when the first transmission waves are emitted from the center sensor until when the second transmission waves are received by the center sensor is located.

* * * * *